United States Patent [19]
Hsu

[11] Patent Number: 5,426,564
[45] Date of Patent: Jun. 20, 1995

[54] MODULAR ELECTRONIC PACKAGING

[76] Inventor: Winston Hsu, 14508 Pebblewood Dr., Gaithersburg, Md. 20878

[21] Appl. No.: 964,569

[22] Filed: Oct. 21, 1992

Related U.S. Application Data

[63] Continuation-in-part of Ser. No. 769,539, Sep. 30, 1991, abandoned.

[51] Int. Cl.$^6$ .............................................. H05K 7/20
[52] U.S. Cl. ................................... 361/707; 361/683; 361/688; 361/732; 361/735; 361/740; 361/744; 361/790; 361/792; 361/785
[58] Field of Search ............................ 361/679–687, 361/728–730, 732, 735, 740, 744, 790, 785, 792; 364/708.1

[56] References Cited

U.S. PATENT DOCUMENTS

| | | | |
|---|---|---|---|
| 3,309,577 | 3/1967 | Roll, Jr. | 317/99 |
| 4,479,198 | 10/1984 | Romano et al. | 361/687 |
| 4,581,495 | 4/1986 | Geri | 179/179 |
| 4,591,949 | 5/1986 | Lahr | 361/394 |
| 4,728,160 | 3/1988 | Mondor | 312/236 |
| 4,748,540 | 5/1988 | Henneberg | 361/424 |
| 4,934,764 | 6/1990 | Leitermann | 312/111 |
| 4,937,771 | 6/1990 | Rumps | 364/708 |
| 4,937,806 | 6/1990 | Babson | 369/754 |
| 5,107,400 | 4/1992 | Kobsyashi | 361/392 |
| 5,132,876 | 7/1992 | Ma | 361/681 |
| 5,224,019 | 6/1993 | Wong et al. | 361/685 |

FOREIGN PATENT DOCUMENTS 2434892 2/1976 Germany .
WO88/08662 11/1988 WIPO .

OTHER PUBLICATIONS

VICOR brochures, 2 copies.
Car Physical, PCMCIA card standard., 1 copy.
Futurelius deals 3–D cards, magazine article, 1 copy.
Megahertz Easytalk Fax Card, 1 page.

*Primary Examiner*—Gregory D. Thompson

[57] ABSTRACT

A modularized electronic system for packaging and assembling one or more electronic module assemblies comprising at least one external enclosure case having one internal room for module mounting. The external enclosure case further comprises at least one upper case assembly and one lower case assembly for clamping the electronic modules in between. Each electronic module comprises a module head and a substantially rectangular module body. The module head further comprises a rigid module connector on its bottom vertically plugged in a receptacle on the lower case assembly. The module body further comprises a substantially flat top end and bottom end and is clamped between upper and lower case assemblies whereby the module assembly can be easily installed or removed by hand without using tools. The internal mounting mechanism of the system greatly simplifies the mounting mechanisms of both the internal modules and the external enclosure case and allows complete modularization of a portable computer system.

47 Claims, 34 Drawing Sheets

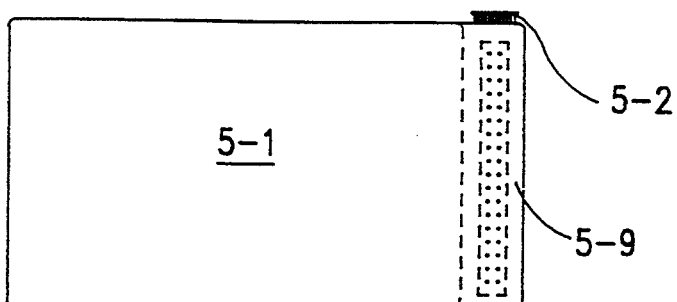
FIG.5A1
FIG.5A3
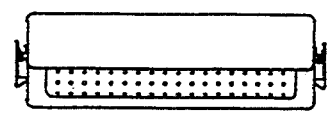
FIG.5A2
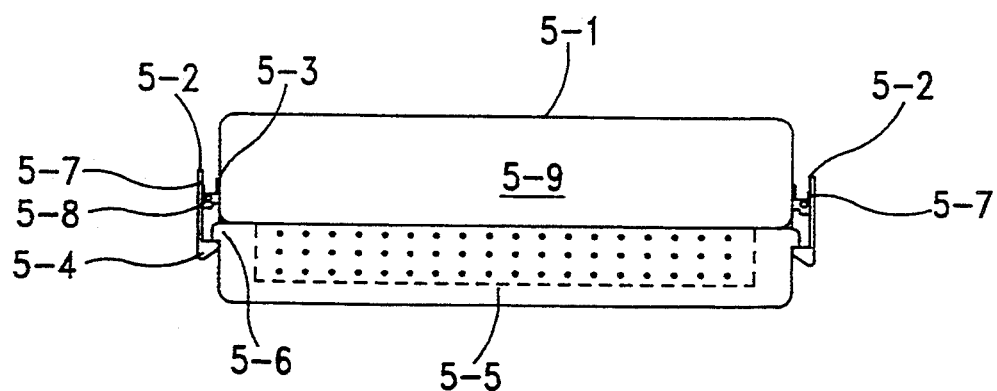
FIG.5B

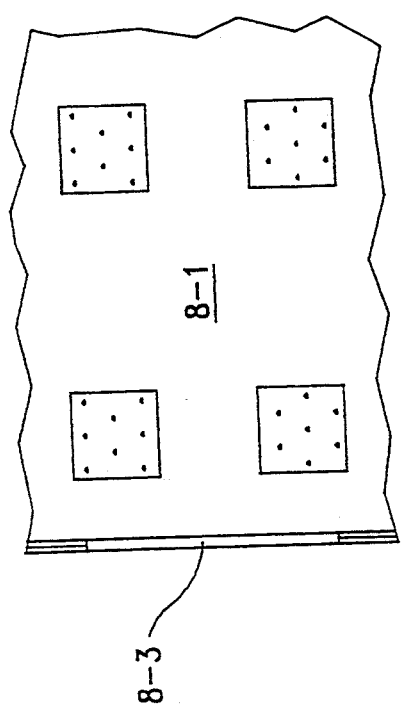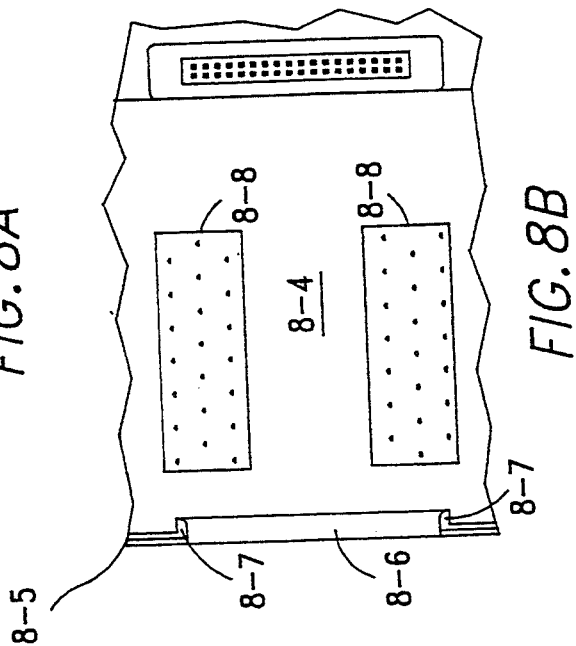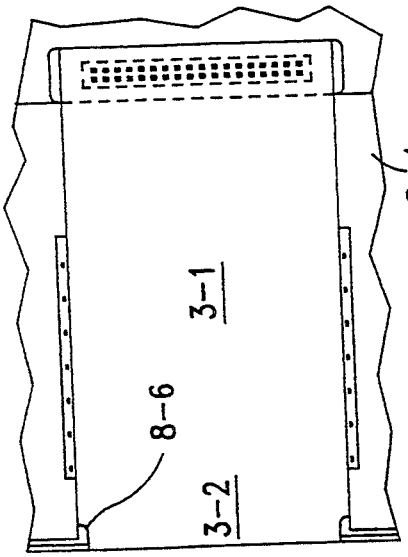

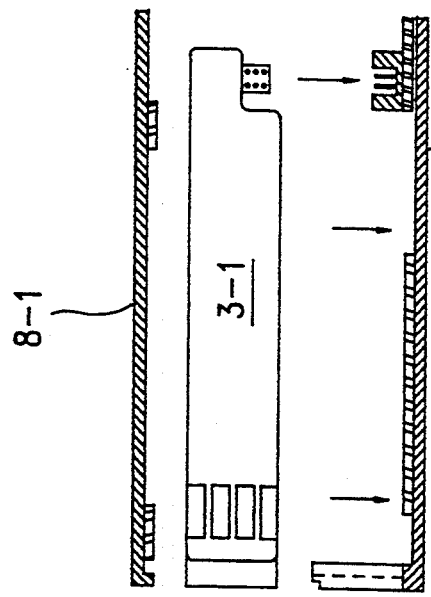
FIG.8D1
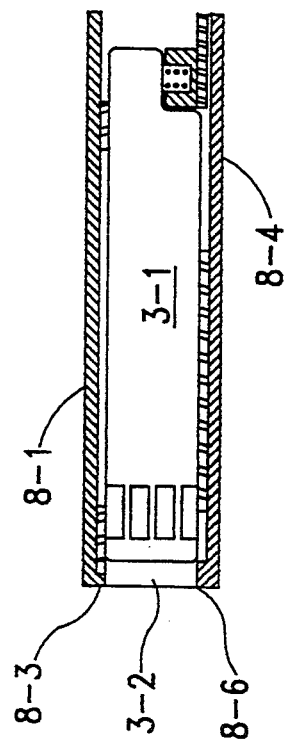
FIG.8E1
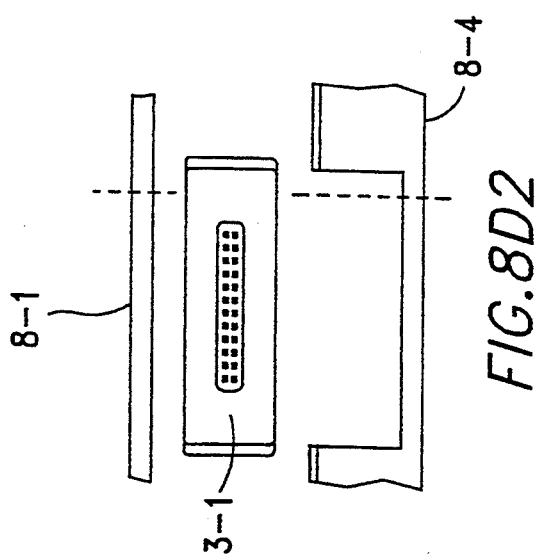
FIG.8D2
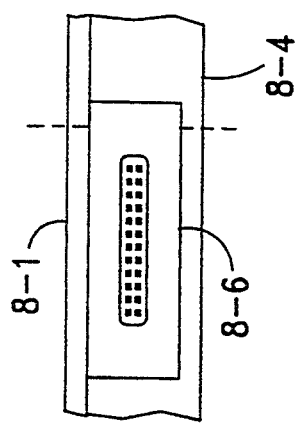
FIG.8E2

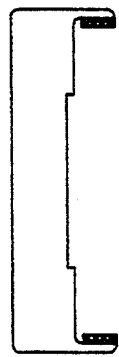
FIG. 15A1
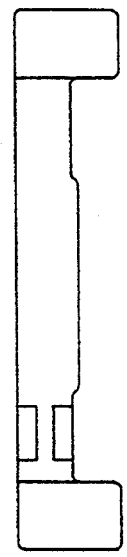
FIG. 15A2
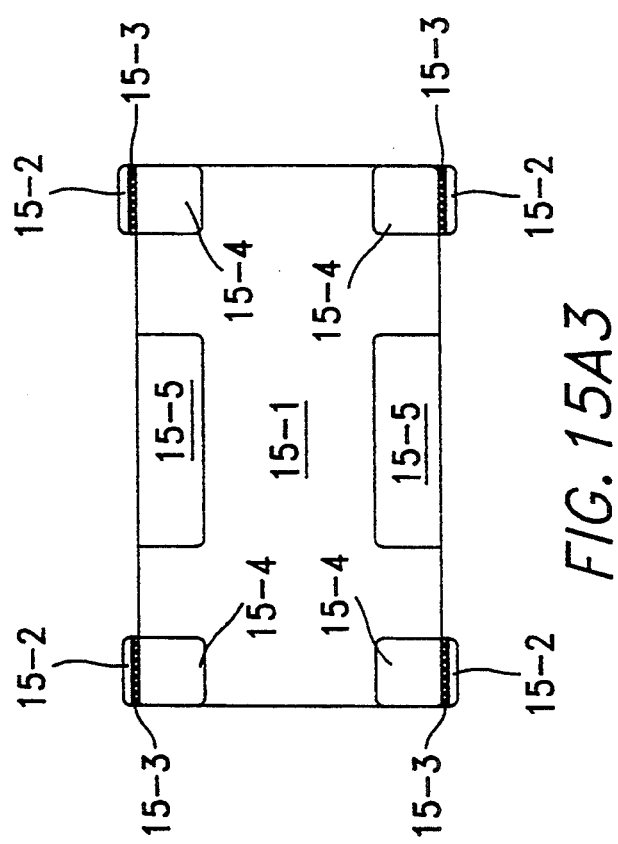
FIG. 15A3

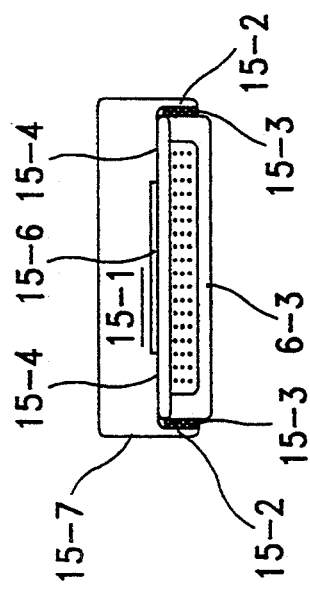
FIG. 15B1
FIG. 15B2
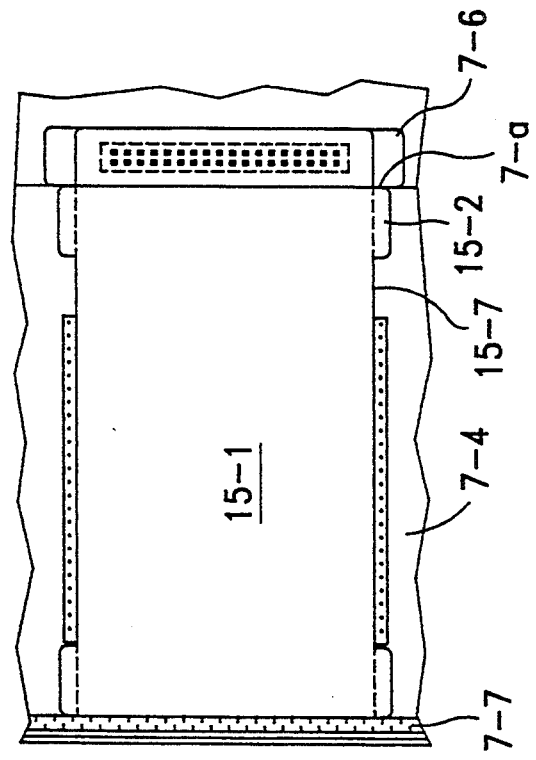
FIG. 15C
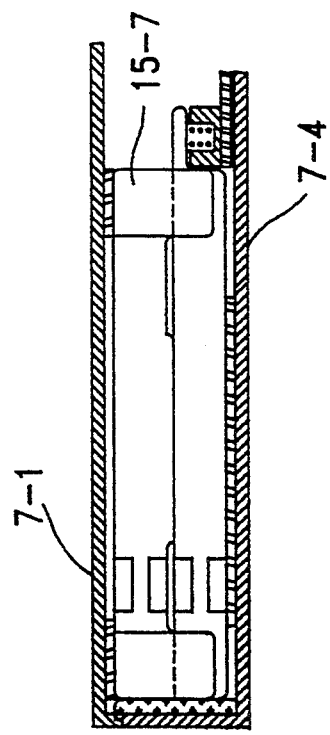
FIG. 15D

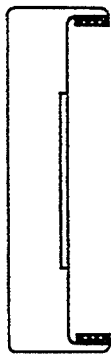
FIG. 16A1
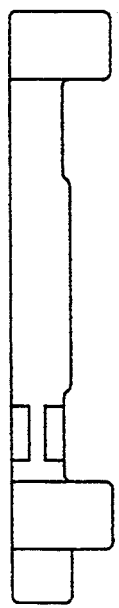
FIG. 16A2
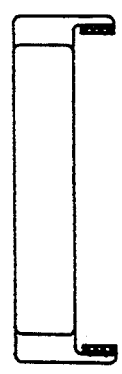
FIG. 16A3
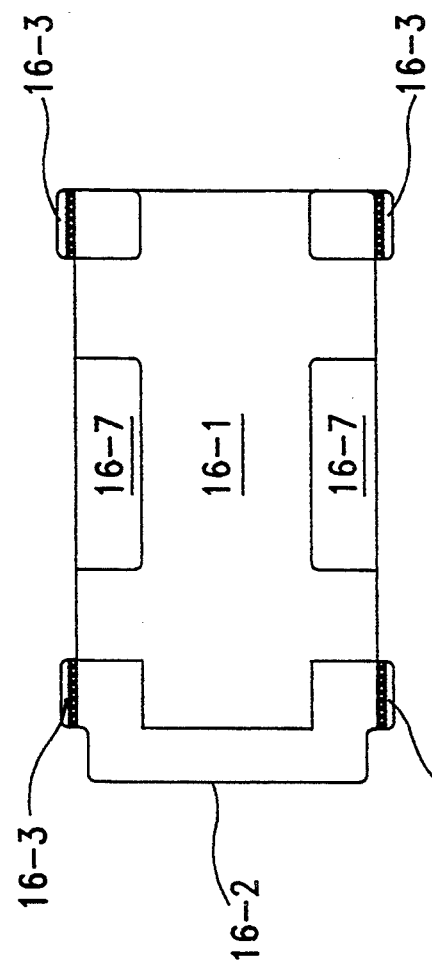
FIG. 16A4

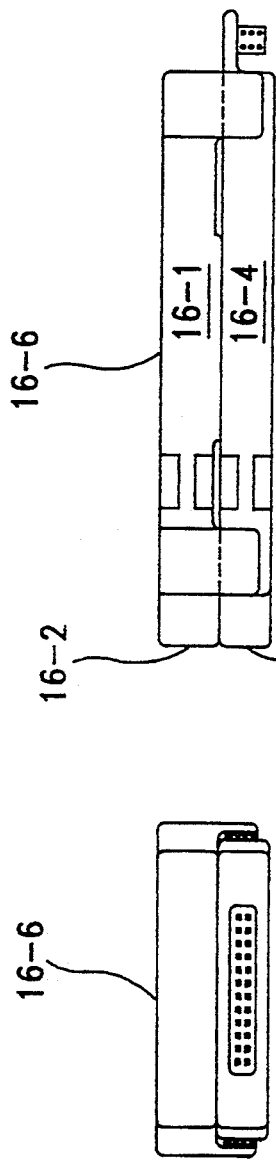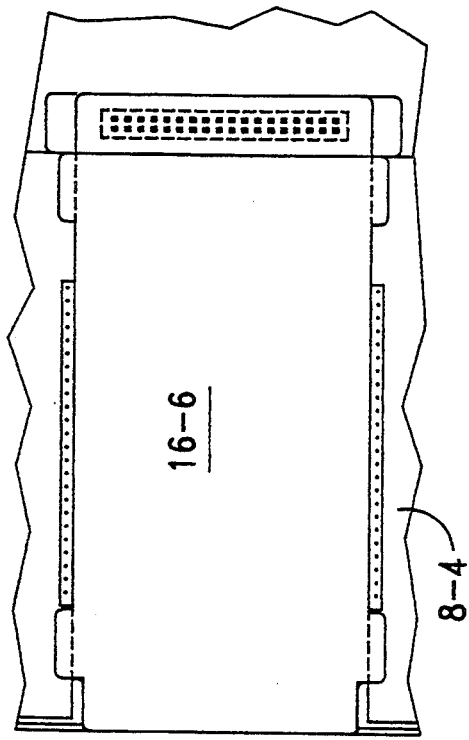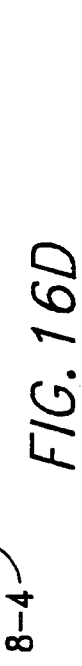

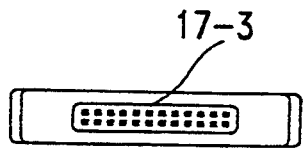 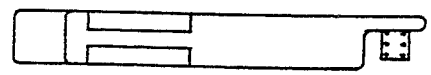
FIG.17A2    FIG.17A1
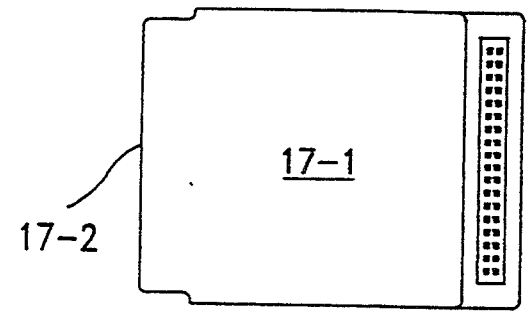
FIG.17A3
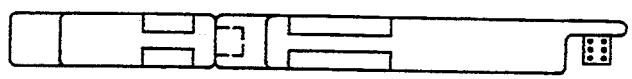 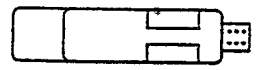
FIG.17C1    FIG.17B1
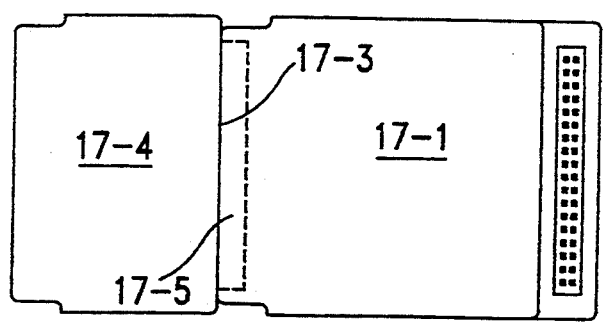 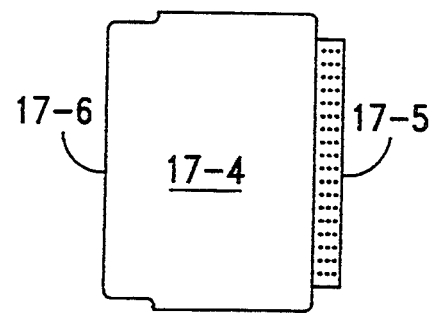
FIG.17C2    FIG.17B2

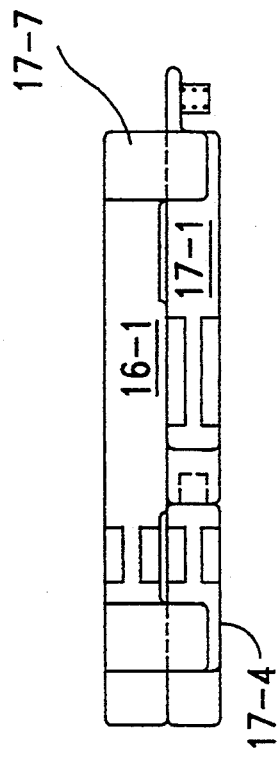
FIG. 17D1
FIG. 17D2
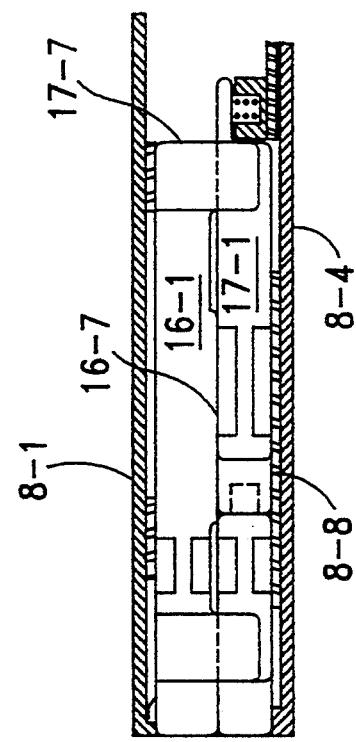
FIG. 17E1
FIG. 17E2

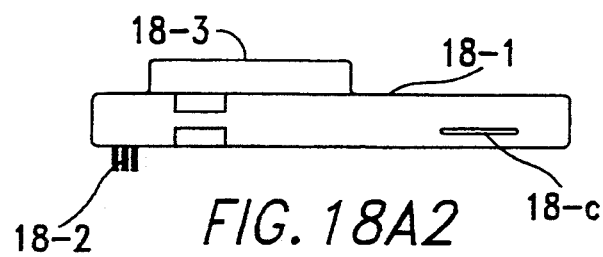
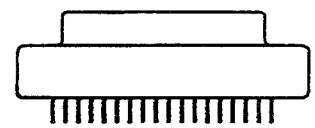
FIG.18A2   FIG.18A1
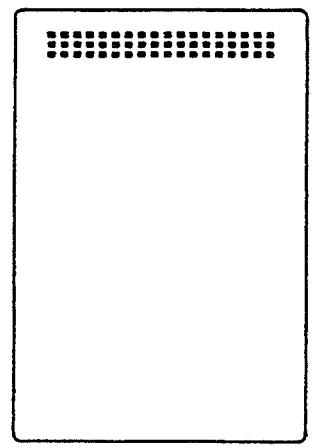
FIG.18A3
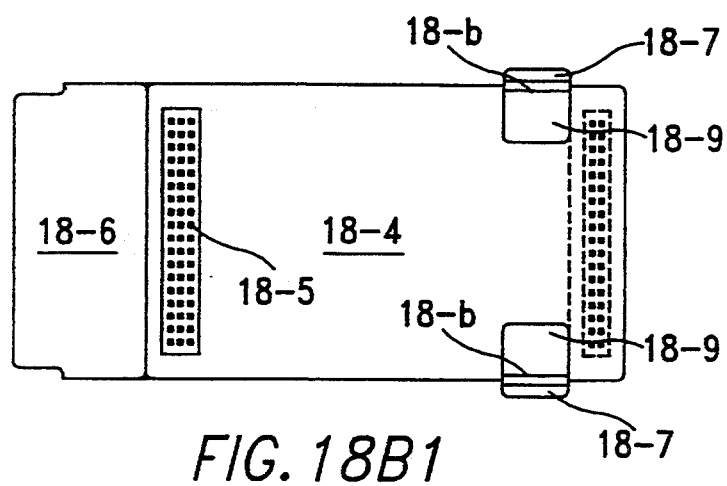
FIG.18B1
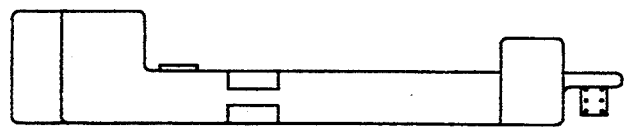
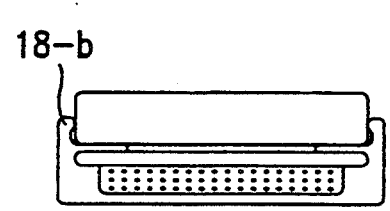
FIG.18B3   FIG.18B2

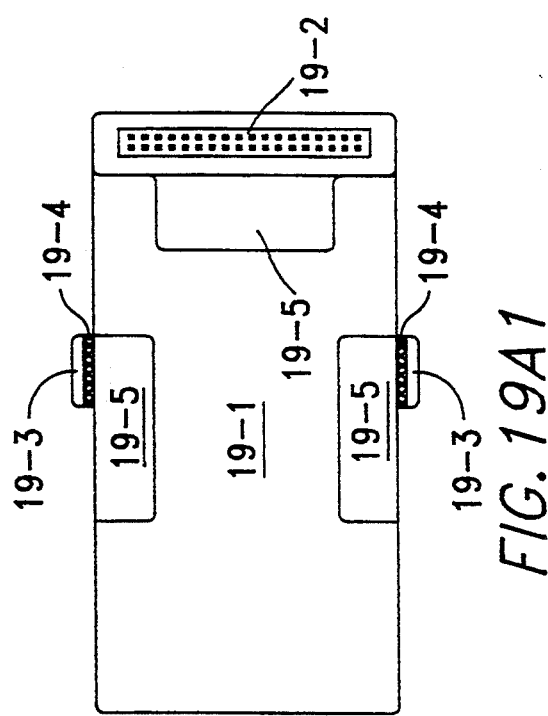
*FIG.19A1*
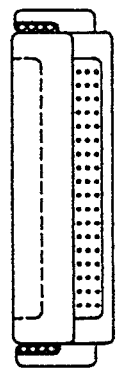
*FIG.19A2*
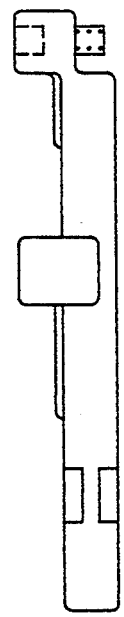
*FIG.19A3*
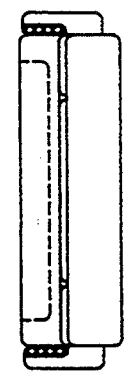
*FIG.19A4*

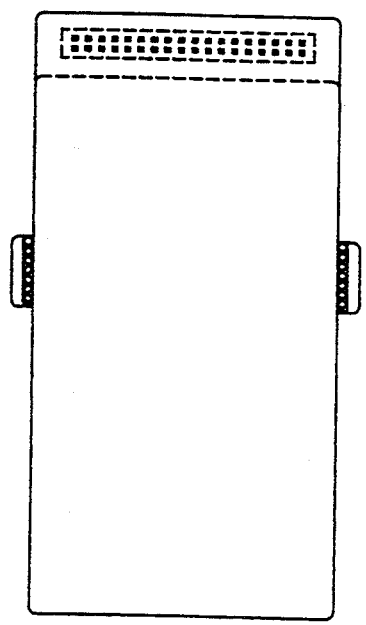
FIG.19B1
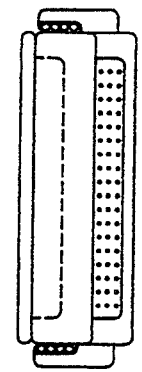
FIG.19B2
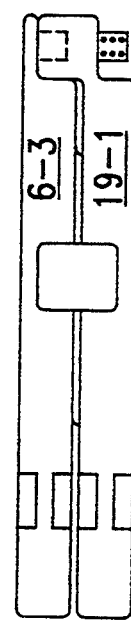
FIG.19B3
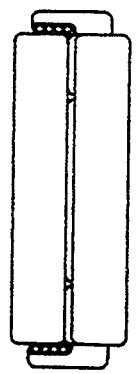
FIG.19B4

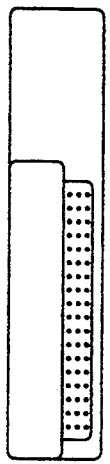
FIG.20A1
FIG.20A2
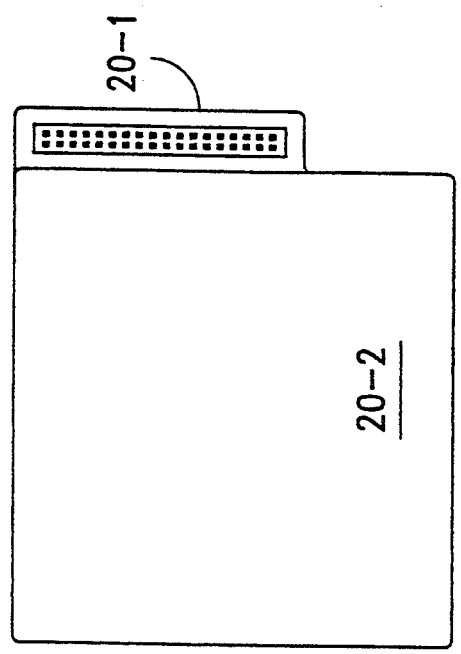
FIG.20A3

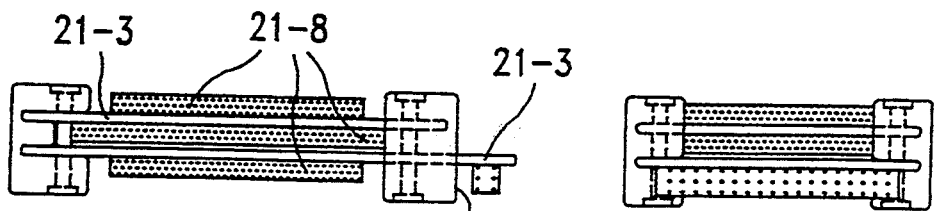
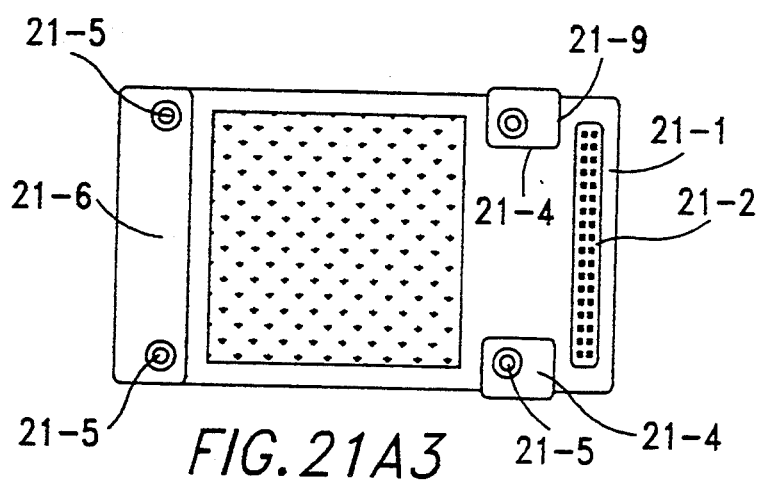
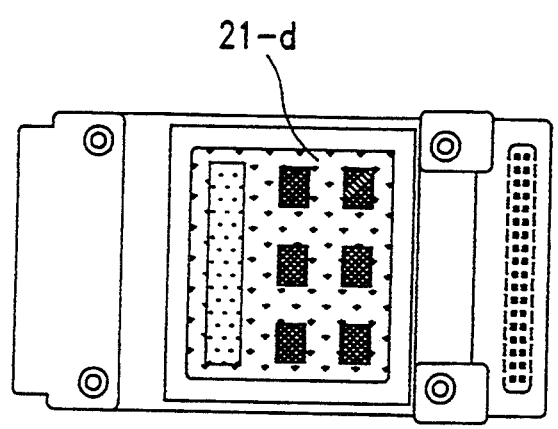
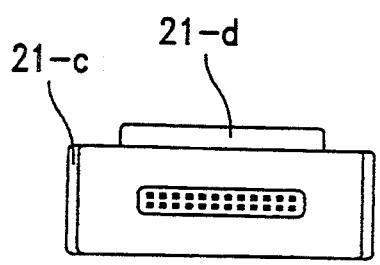
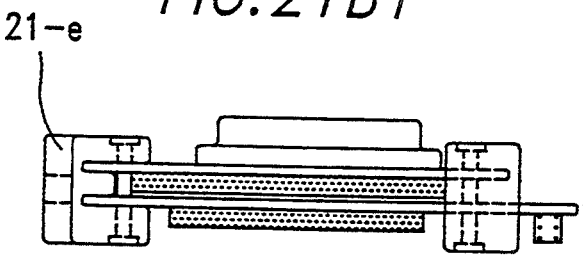

FIG.22A1
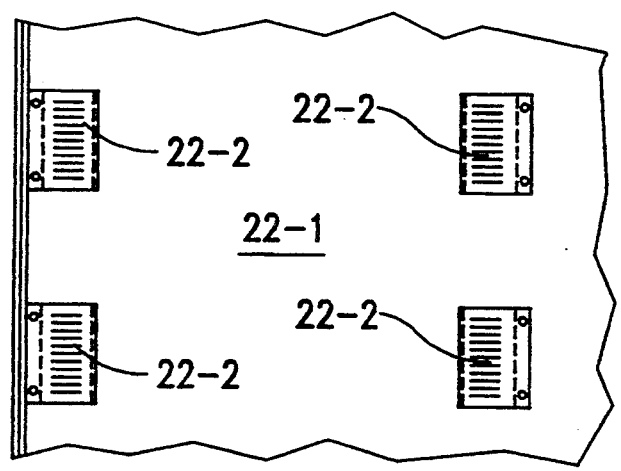
FIG.22A2
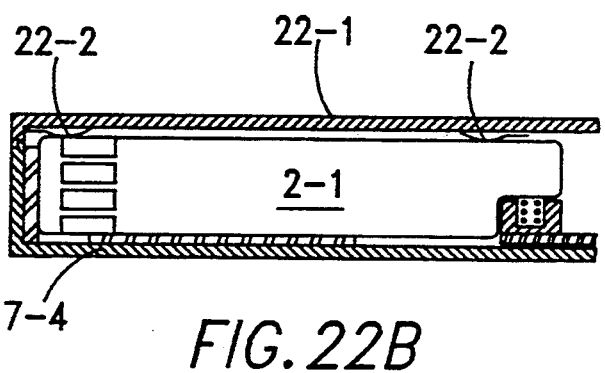
FIG.22B

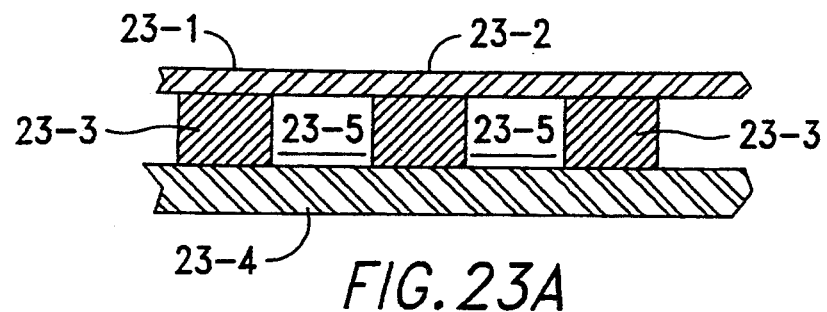
FIG. 23A
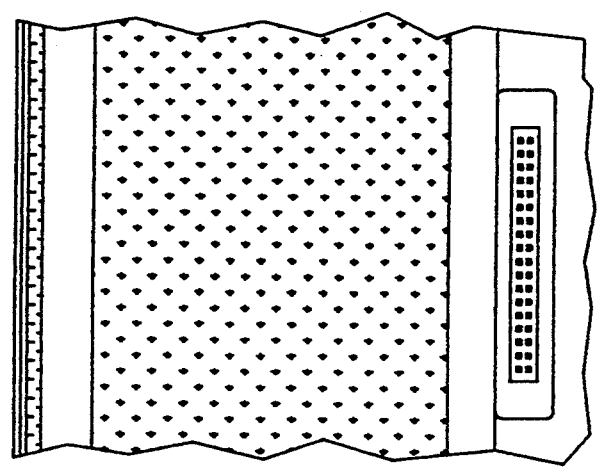
FIG. 23B1
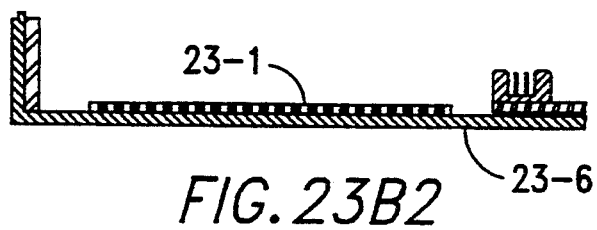
FIG. 23B2
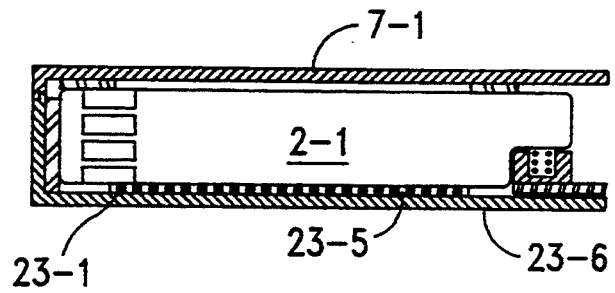
FIG. 23C

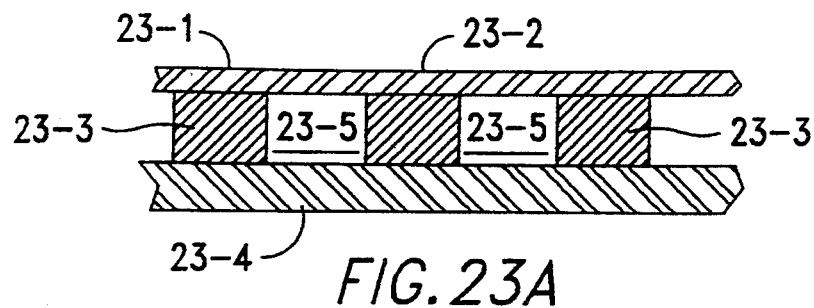
FIG.23A
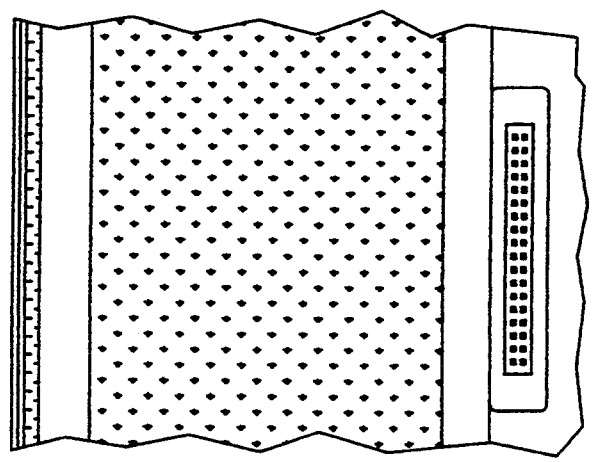
FIG.23B1
FIG.23B2
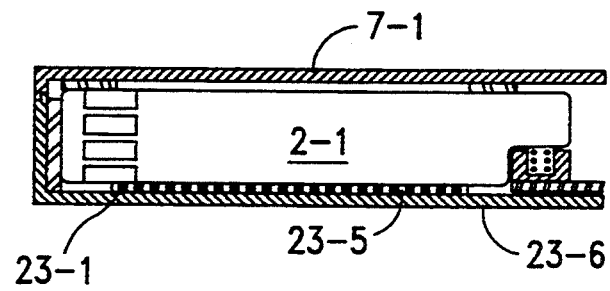
FIG.23C

MODULAR ELECTRONIC PACKAGING

This application is a CIP of application 07/769,539, filed Sep. 30, 1991 now abandoned.

BACKGROUND OF THE INVENTION

1. Field of the Invention

This invention relates generally to the internal mounting mechanism of an electronic enclosure system, e.g., a portable computer, and more particularly, to an enclosure system comprising one or more electronic modules and an external enclosure case for mounting all these module assemblies without screws.

2. Description of the Prior Art

The internal mounting mechanism design of portable computers is becoming more and more challenging and difficult as portable computers become smaller and lighter. Electronic and hard tooling designs are complicated by different system form factors, such as laptop, notebook, sub-notebook, and palmtop. Any change in a portable computer's external industrial design or internal mounting design always results in significant costs and engineering effort, as well as associated incompatibility and obsolescence problems between old and new products. However, severe market competition and ever-changing customers' demands and tastes give portable computer vendors no choice. Constant changes in mechanical or electronic designs are part of the daily events faced by portable computer vendors. At the same time, the fast progress in computer technology, with its ever-decreasing sizes has made the internal mounting problems more complex. New progress is made daily in many areas such as small hard drives, pen-based computing, wireless communication, multimedia, etc. Severe price competition, plus lack of expandability, makes it a tricky task for portable computer vendors to decide whether to integrate a new component or not. Most of the problems experienced in portable computers are caused by the systems' overly complicated internal mounting mechanism designs.

The traditional screw mounting mechanisms of desktop computers used for the mounting of internal modules conform to several established component form factor standards for add-on cards, drives, power supplies, or motherboards, etc. The system of desktop standards is bulky but works. The great expandability and wide range of commercially available standard modules is one of the major reasons that personal computers are so popular. But unfortunately this story has not been duplicated in the current generation of portable computers. In mounting so many small components in a portable computer case, screw mounting mechanisms lose their traditional advantages. Highly integrated PCB boards designed to fit small, irregular spaces make a portable computer more compact also make it difficult to accommodate new design changes. Small precision screws used to support PCB boards and modules not only make it difficult to change the hard tooling, but also make it difficult to work with the computers. Some portable computers sold in current markets have more than 30 screws inside. It is not easy to assemble or maintain systems like these. Additionally, the sophisticated internal mounting mechanism supported by screws and fixed frames makes a portable computer weak in terms of shock protection. Shocks such as dropping a portable computer on the ground often cause severe damage to internal components and their sophisticated mounting mechanisms. The rigid screw mounting also provides no protection from vibrations either from inside the system like the noise from a hard drive, or from outside the system like vibration from a factory floor or car.

In addition to all these drawbacks, screw mounting is also a key obstacle in portable computer modularization. Small drive form factors including 3.5", 2.5", 1.8" and 1.3" are often defined based on screw mounting requirements. The hard tooling changes and incompatibilities between different form factors make it difficult for system vendors to choose to implement new technology, and also make component vendors reluctant to produce smaller and more compact components. Modularization efforts by portable computer vendors are mostly restricted to very limited extent, such as CPU modules, memory modules, internal modems, etc. Lack of expandability plus severe price competition greatly reduces the chance for many new or existing technologies to be incorporated into portable computers. A lot of electronic components have to be designed as external modules. External modules are weak in the sense that they usually need separate power sources and can only communicate with a portable computer through slow I/O ports. Also handling external modules is cumbersome—a user must set up the external module every time when he/she needs to use it.

A new industrial standard—PCMCIA has been set up to establish a modular standard for portable computers. The PCMCIA card is a credit card size module with a standard connector in its front end which can be slid in a card slot of a portable computer almost like a 3.5" floppy diskette. The PCMCIA card is very solid and portable which makes it a convenient solution for portable computer expandability. But it is not designed as a standard internal mounting mechanism for complete modularization of the portable computers. It is impossible to modularize a whole portable computer system based on PCMCIA card design.

New internal mounting mechanisms are necessary to allow complete modularization of portable computers to accommodate new technologies and changes, and also to avoid all the drawbacks from traditional screw mounting mechanisms and other problems discussed above.

Modular assembly and enclosure design of electronic devices and computer systems is the subject matter disclosed in several U.S. patents.

U.S. Pat. No. 4,748,540 to Henneberg et al., entitled "Compact Packaging of Electronic Equipment within Small Profile Enclosure" (May 31, 1988) discloses a computer enclosure system having a plurality of modular shelves mounted on a pair of rail members attached to the rear of the enclosure. It also includes cable troughs and enclosure openings to improve cable connection arrangements and air flow efficiency. The modular packaging disclosed in this patent may provide a means to improve the inter-connection of the cables between the shelves and provide a more compact and lower profile computer system. However the internal mounting mechanism presented by Henneberg is too complex and difficult to be implemented in a small, low-profile portable computer system.

U.S. Pat. No. 4,728,160 to Mondor et al., entitled "Cabinet for a Computer Assembly" (Mar. 1, 1988), discloses a computer system housing having a frame base to support a main unit comprising a central processor and a power supply. The computer system also has a front compartment for mounting the mass storage memory units. The frame and the housing are designed to provide easy access for removal, repair, or replacement. Again, the internal mounting mechanism presented in this patent is also too complex and difficult to be implemented in a portable computer system.

Leitermann et al discloses in U.S. Pat. No. 4,934,764, entitled "Computer System Module Assembly", (Jun. 19, 1990) a multi-level frame structure wherein each level is a horizontal module having an enclosure which houses a plurality of computer components. Some of the electronic components are configured to be inserted by sliding into the horizontal module and clamped to the module structure. The horizontal modules are then further assembled into a stack by the use of a modular exoskeletal frame structure which provides a means to securely engage the horizontal modules. Similar to the Mondor patent, the horizontal modules disclosed in this patent provide easy access for repair, removal, and replacement. However, the internal mounting mechanism is not suitable for a portable computer.

In general, all the prior art devices fail to solve the internal mounting problems of portable computers where the mounting mechanisms are very complex and impose a high level of difficulty to modify existing designs.

SUMMARY OF THE PRESENT INVENTION

It is therefore the goal of the present invention by overcoming the limits of the prior art to devise new internal mounting mechanisms to achieve the following objects:
1. Design a general purpose mounting mechanism for both the internal modules and the external enclosure case which allows complete modularization of a portable computer system.
2. Allow the installation or removal of all the internal modules of a portable computer by hand without using any tools.
3. Provide good shock protection, vibration absorption, and heat dissipation to modules mounted inside a portable computer case.
4. Allow systematic module size variations up to the maximum extent of a portable computer case without mounting problems.
5. Allow many case-dependent components to be modularized as standard modules, including pointing device, speaker, control switches, etc.
6. Allow the design of composite modules which are created by connecting two or more small modules together and their electronic functions or mechanical features can be easily changed.
7. Provide good adaptability for small modules to fit into bigger cases.
8. Allow internal modules constructed by traditional PCB-based technologies be mounted like other types of modules.
9. Allow easy expansion of the module connector.

Briefly, in a preferred embodiment, the present invention includes a modularized electronic system for packaging and assembling one or more electronic module assemblies comprising one external enclosure case having at least one internal room with one top panel, one bottom panel and at least one side panel for module mounting purpose. The external enclosure case further comprises at least two case assemblies each having at least one case assembly attachment means wherein the assembly attachment means of one of said case assemblies engages and securely attaches to the assembly attachment means of another of the case assemblies in a removable manner. One of the case assemblies comprising the top panel of the internal room is called the upper case assembly and another of the case assemblies comprising the bottom panel of the internal room is called the lower case assembly.

The modularized electronic system comprises at least one electronic module assembly having a module head in its front end and a substantially rectangular module body behind the module head. The module head is rigidly connected to the module body. The module head further comprises a rigid module connector installed on its bottom facing downward for transmitting digital signals and power. The lower case assembly further comprises a correspondent rigid BUS receptacle installed on the bottom panel of the internal room wherein the module connector of the module head is vertically plugged into the BUS receptacle of the lower case assembly in a removable manner whereby the module assembly is reliably mounted on the lower case assembly horizontally.

The module body further comprises at least one substantially flat area on each of its upper and lower ends as a module clamping zone and each of the upper and lower case assemblies further comprises at least one correspondent flat area on the top panel and bottom panel of the internal room as a case clamping zone with a cushion means installed on the module contacting part wherein the module body is clamped between the case clamping zones of the upper and lower case assemblies over the module clamping zones whereby the module assembly is reliably mounted inside the internal room of the external enclosure case and can be easily removed or installed by hand when the upper case assembly is removed.

It is an advantage of the present invention that a module plugged in a BUS receptacle is directly clamped between the upper and lower case assemblies without using any screw, and thus greatly simplifies the mounting mechanisms of the modules and the external enclosure case. It also simplifies the module installation.

It is another advantage of the present invention that modules clamped between the cushion means of the upper and lower case assemblies get very good shock and vibration protection from the external enclosure case.

These and other objects and the advantages of the present invention will no doubt become obvious to those of ordinary skill in the an after having read the following detailed description of the preferred embodiment which is illustrated in the various drawing figures.

BRIEF DESCRIPTION OF THE DRAWINGS

FIG. 4 shows the top, front and side views of the construction of a full size module with an upper protruding port.

FIG. 5A shows the top, front and side views of the construction of a full size module with two elastic clip devices installed on both sides of its module head.

FIG. 5B shows the detail construction of the clip devices of the module in FIG. 5A connected to a receptacle with two hook receiving devices on both sides.

FIG. 7A is a bottom view of part of an upper case assembly with cushion pads installed on its top panel. FIG. 7B is a top view of part of a lower case assembly with a BUS receptacle and cushion pads installed on its bottom panel. FIG. 7C is an exploded side section view of the external enclosure case and a full size module. FIG. 7D is a side section view of the external enclosure case with the full size module installed.

FIGS. 8A–8E illustrates mounting a full size module with a rear protruding port in an external enclosure case. FIG. 8A is a bottom view of part of an upper case assembly with cushion pads installed. FIG. 8B is a top view of part of a lower case assembly with a BUS receptacle and a side opening installed. FIG. 8C is a top view of the lower case assembly installed with a full size module with a rear protruding port. FIG. 8D is an exploded side section view and a rear view of the external enclosure case and the full size module. FIG. 8E is a side section view and a rear view of the external enclosure case with the full size module installed.

FIG. 9A is a bottom view of part of an upper case assembly with a top opening and cushion means installed. FIG. 9B is an exploded side section view of the external enclosure case and a full size module having both rear and upper protruding ports. FIG. 9C is a side section view of the external enclosure case with the full size module installed.

FIG. 10A is a bottom view of a full size module with a sticking means installed on its rear bottom end. FIG. 10B is a top view of part of a lower case assembly with a correspondent sticking receiving means installed on its bottom panel. FIG. 10C is an exploded side section view of the external enclosure case and the full size module. FIG. 10D is a side section view of the external enclosure case installed with the full size module.

FIG. 11A is a top view of part of a lower case assembly having a BUS receptacle with two hook receiving devices on both sides. FIG. 11B is a top view of the lower case assembly installed with a full size module having two elastic clip devices on its module head. FIG. 11C is an exploded side section view of the external enclosure case and the full size module. FIG. 11D is a side section view of the external enclosure case installed with the full size module.

FIG. 12A is a top view of a lower case assembly installed with a full size module with both rear and upper protruding ports having two elastic clip devices on its module head. FIG. 12B is an exploded side section view of the external enclosure case and the full size module. FIG. 12C is a side section view of the external enclosure case installed with the full size module.

FIG. 13A is a top view of part of a lower case assembly with a small module having two elastic clip devices on its module head and sticking means under its module body (shading area). FIG. 13B is an exploded side section view of the external enclosure case and the small module. FIG. 13C is a side section view of the external enclosure case with the small module installed.

FIG. 14A is a bottom view of a full size module with an extended module connector. FIG. 14B is a top view of part of a lower case assembly with an extended BUS receptacle. FIG. 14C is a side section view of the external enclosure case installed with the full size module. FIG. 14D is a comparison to FIG. 14C and shows a side section view of the external enclosure case installed with a full size module having standard module connector.

FIGS. 15A–15D illustrates the construction and usage of a mounting kit. FIG. 15A shows the front, side and bottom views of a mounting kit with four holding arms. FIG. 15B is a front view and a side view of a composite module created by stacking the mounting kit on top of a small module. FIG. 15C is a top view of part of a lower case assembly with the composite module installed. FIG. 15D is a side section view of the external enclosure case with the composite module installed.

FIGS. 16A–16D illustrates the construction and usage of a mounting kit with rear protruding port. FIG. 16A shows the front, side, rear and bottom views of a mounting kit with rear protruding port. FIG. 16B is a side view and a rear view of a composite module created by stacking the mounting kit on top of a small module having a rear protruding port. FIG. 16C is a top view of part of a lower case assembly having the composite module installed. FIG. 16D is a side section view of the external enclosure case with the composite module installed.

FIGS. 17A–17E illustrates the construction and usage of an adaptor. FIG. 17A shows the side, rear and bottom views of a small module with a rear protruding port. FIG. 17B shows the side and bottom views of an adaptor module with a connector on its front end. FIG. 17C shows the side and bottom views of the small module connected with the adaptor module. FIG. 17D shows the side and rear views of a composite module created by stacking the mounting kit in FIGS. 16A–16D on top of the small module and the adaptor module. FIG. 17E shows the side section view and the rear view of an external enclosure case with the composite module installed.

FIGS. 18A–18E illustrates a composite module with changeable upper protruding ports. FIG. 18A shows the front, side and bottom views of a small module with an upper protruding port. FIG. 18B shows the top, front and side views of a base module with a rear protruding port. FIG. 18C shows the top, front and side views of a composite module created by latching these two small modules together. FIG. 18D is a top view of part of a lower case assembly with the composite module installed. FIG. 18E is a side section view of the external enclosure case with the composite module installed.

FIGS. 19A–19D illustrates a small module stacked on top of a base module having a standard receptacle on its module head. FIG. 19A shows the top, front, side and rear views of a base module with a standard receptacle on its module head. FIG. 19B shows the top, front, side and rear views of a composite module created by stacking a small module on top of the base module. FIG. 19C is a top view of part of a lower enclosure case with the composite module installed. FIG. 19D is a side section view of the external enclosure case with the composite module installed.

FIGS. 20A–20D shows an oversize module and its mounting. FIG. 20A shows the front, side and bottom views of an oversize module. FIG. 20B is a top view of part of a lower case assembly for mounting the oversize module. FIG. 20C is a top view of the lower case assembly with the oversize module installed. FIG. 20D is a side section view of the external enclosure case installed with the oversize module.

FIGS. 21A–21E illustrates the construction of two PCB modules and their mountings. FIG. 21A shows the front, side and bottom views of a PCB module. FIG. 21B shows the top, side and rear view of another PCB module with rear and upper protruding ports. FIG. 21C is a top view of part of a lower case assembly with the first PCB module installed. FIG. 21D is a side section view of the external enclosure case installed with the first PCB module. FIG. 21E is a side section view of an external enclosure case installed with the second PCB module.

FIGS. 22A–22B illustrates using elastic springs as upper cushion means for module mounting. FIG. 22A shows a side section view and a bottom view of part of an upper case assembly with four elastic springs installed for module mounting. FIG. 22B is a side section view of the external enclosure case with a full size module installed by using the upper elastic springs.

FIGS. 23A–23C illustrates a metallic cushion means for module heat dissipation. FIG. 23A is a side section view of a metallic cushion means. FIG. 23B shows a top view and a side section view of part of a lower case assembly with the metallic cushion means installed. FIG. 23C is a side section view of the external enclosure case with a full size module installed on top of the metallic cushion means.

DETAILED DESCRIPTION OF THE PREFERRED EMBODIMENT

Figure 1A:
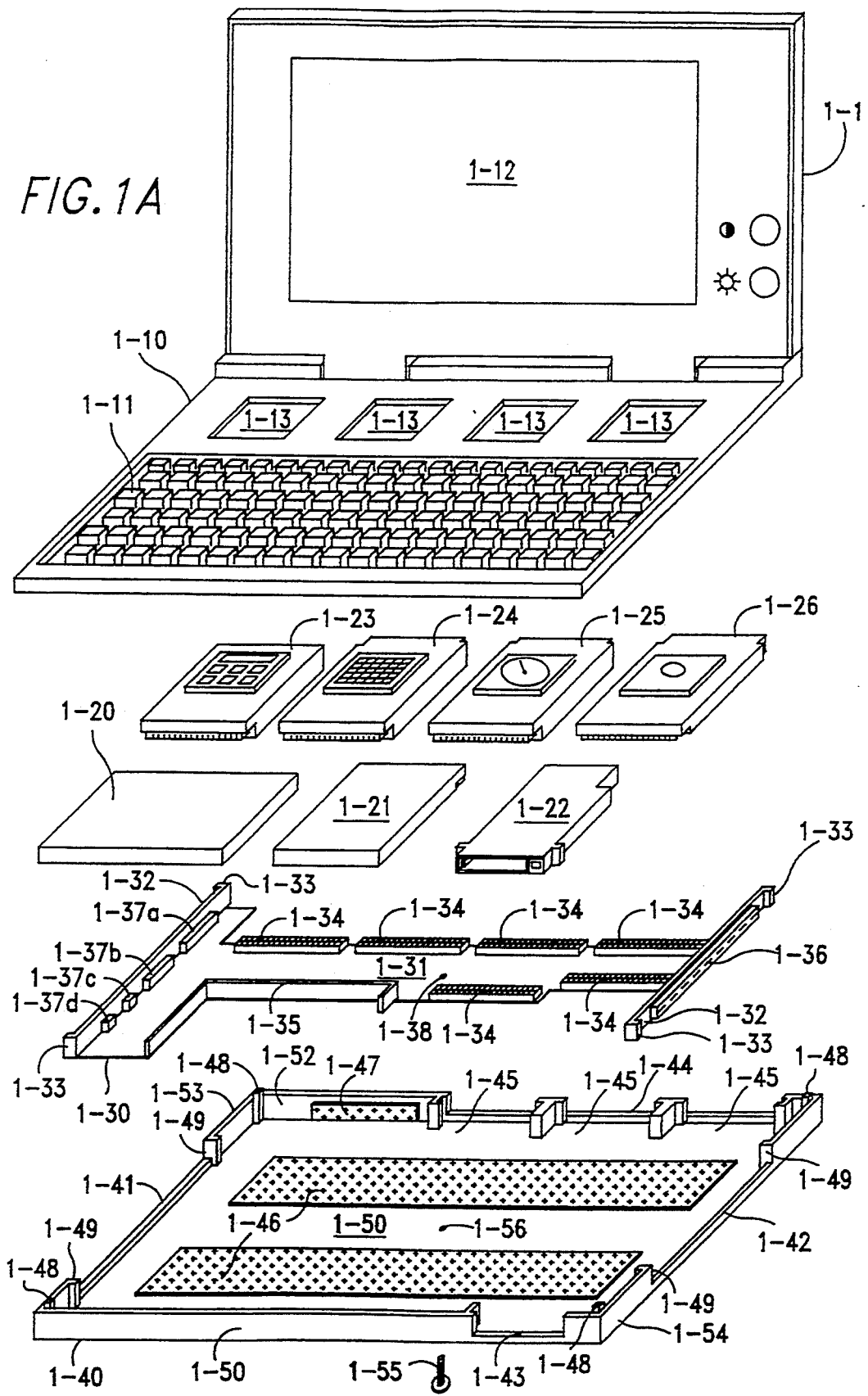
FIG. 1A is an exploded perspective view of a portable computer according to the present invention.
Figure 1B:
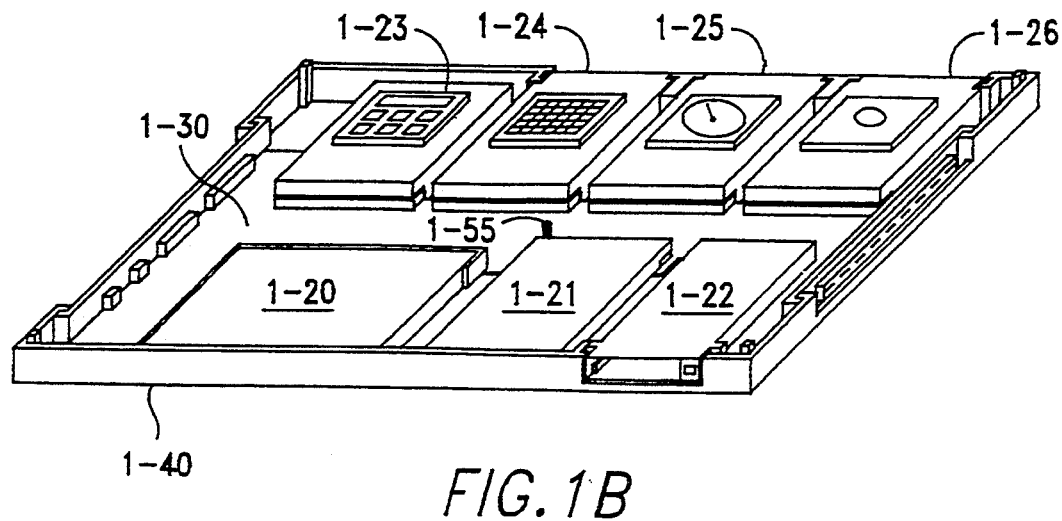
FIG. 1B is a partial perspective view of FIG. 1A having a lower case assembly with all the module assemblies and the expansion BUS module installed.
Figure 1C:
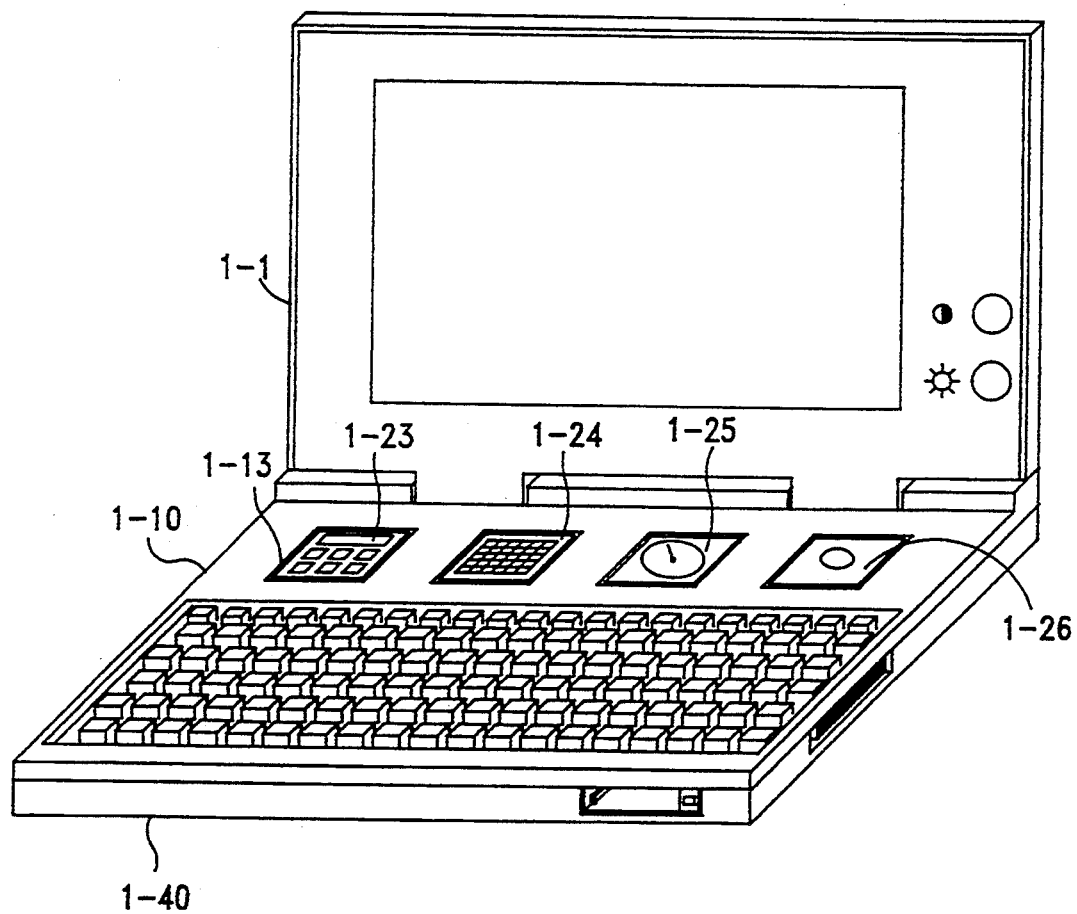
FIG. 1C is a perspective view of the final system assembly of FIG. 1A and shows the I/O ports of the portable computer system.
Figure 2B:
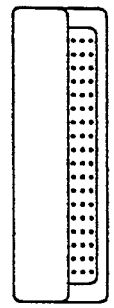
FIG. 2 shows the side, front and bottom views of the construction of a full size module assembly.
Figure 2A:
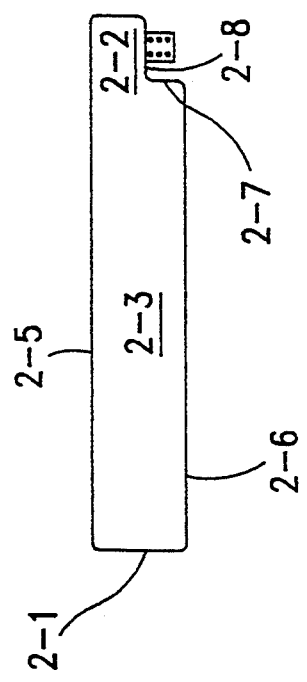
Figure 2C:
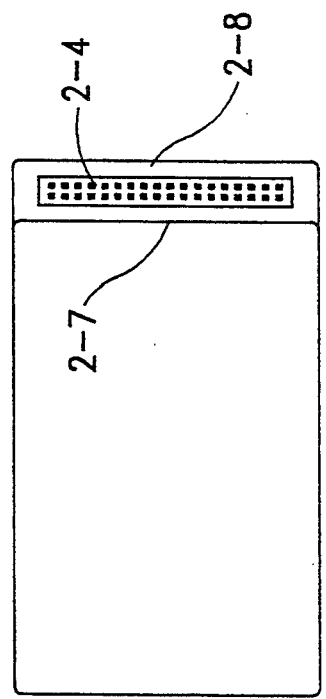

FIGS. 1A–1C shows a modularized portable computer system 1-1 according to the present invention. FIG. 1A shows the modularized portable computer system 1-1 in a disassembled form. Upper case assembly 1-10 has a keyboard 1-11, a LCD screen 1-12 and four top openings 1-13. Upper case assembly 1-10 and lower case assembly 1-40 can be fastened together by one screw 1-55 and four vertical studs 1-48 of lower case assembly 1-40. The four corners of upper case assembly 1-10 will be attached to the four studs 1-48 to secure the mounting in horizontal direction. Screw 1-55 is a large slotted screw designed to be removed with a coin or other common tools. It extends through screw mounting hole 1-56 of the lower case assembly 1-40 and screw mounting hole 1-38 of the expansion BUS module 1-30, and is fastened to a screw receiving hole (not shown) on the bottom side of upper case assembly 1-10. It is possible to eliminate the last screw 1-55 by carefully using some latching devices to link the upper and lower case assemblies together.

There are six electronic modules, 1-20, 1-21, 1-22, 1-23, 1-24, 1-25, 1-26, and one expansion BUS module 1-30 in this system. Module 1-20 is a battery and will be installed to battery socket 1-35 of expansion BUS module 1-30. Module 1-21 is a hard drive which has no external port. Module 1-22 is a memory card guide which can take two commercially available memory cards. Module 1-23 is a composite system module which has CPU, memory and system control logic in it. It further contains a control panel on its upper protruding port which has 6 keys and one small LED display. A composite module comprises at least two small module assemblies each having at least one small module attachment means wherein the small module attachment means of one of the small module assemblies engages and securely attaches to the small module attachment means of another of the small module assemblies in a removable manner whereby said composite module can be assembled or disassembled by hand and it can further allow changing of its electronic functions or mechanical features by changing its small module assemblies. The constructions of various composite modules will be discussed from FIGS. 15A–15D to FIGS. 19A–19D. Module 1-24 is a composite multimedia module with a speaker on its upper protruding port. Module 1-25 is a cellular fax/modem module with an circular antenna on its upper protruding port. Module 1-26 is a composite LAN module with a track-ball mouse on its upper protruding port. The front end module connectors of all these modules 1-21, 1-22, 1-23, 1-24, 1-25 and 1-26 will be vertically plugged into BUS receptacles 1-34 of expansion BUS module 1-30.

The modular design of this invention greatly increases expandability over present portable computers designs. Many new technologies such as multimedia and cellular communications can be designed into such internal modules. Internal modules have some advantages over external modules such as external modems or portable SCSI controllers. Internal modules can get power directly from a system and communicate with the system through the expansion BUS module, all through one module connector. Internal modules can also provide power saving features to extend a system's battery life. Internal modules also simplify the user's interaction with the system, especially when compared with the inconvenience of handling and using external modules.

Expansion BUS module 1-30 has two metal plates 1-32 on its left and right sides. Metal plate 1-32 has two hook devices 1-33 on both ends which will be vertically plugged into to the correspondent hook receiving devices 1-49 of lower case assembly 1-40. There are several I/O ports connected to the metal plates 1-32: expansion port 1-36 on the fight and, parallel port 1-37a, serial port 1-37b, external keyboard port 1-37c and A/C adapter port 1-37d on the left. There are six BUS receptacles 1-34 on the PCB board 1-31 of expansion BUS module 1-30 for transmitting digital electronic signals and power to modules. Expansion BUS module which transmits optical signals as media through the module interface can also use such internal mounting mechanism design.

Lower case assembly 1-40 is the bottom unit for mounting the expansion BUS module and all the modules. It has a bottom panel 1-50, a front panel 1-51, a rear panel 1-52, a left panel 1-53 and a right panel 1-54. Side opening 1-41 on left panel 1-53 and side opening 1-42 on right panel 1-54 are used for all the I/O ports of expansion BUS module 1-30. Side opening 1-43 in the front panel 1-51 will mount the external port of module 1-22. Three inner side openings 1-45 on the rear side are used to mount the I/O ports of module 1-24, 1-25 and 1-26 and all these ports can be accessed externally through outer side opening 1-44 on the rear panel 1-52. Cushion pads 1-46 are installed on bottom panel 1-50 to provide shock protection to all the modules mounted above them. Cushion pad 1-47 on rear panel 1-52 is used to provide shock protection to the rear end of module 1-23.

FIG. 1B shows lower case assembly 1-40 loaded with expansion BUS module 1-30 and all the other modules. It also shows the upper half of the screw 1-55 which extends through lower case assembly 1-40 and expansion BUS module 1-30. All these modules including the expansion BUS module can be vertically installed or removed by hand without using any tools. Such vertical installation not only facilitates human system assembly work, but also facilitates robotic installation because most robots used in electronic assembly lines have only vertical vision and perform mostly vertical installation motions.

All these modules and the expansion BUS module 1-30 will later on be clamped by upper case assembly 1-10 over their upper ends in FIG. 1C. No screw is used in mounting these modules. Zero screw mounting greatly simplifies the internal mounting mechanism design of a portable system. Additionally, zero screw mounting avoids the problem of ever-changing screw mounting standards for different module form factors and the costly hard tooling changes associated with it. How to accommodate a module's form factor change without using screw will be discussed later on.

Zero screw mounting not only simplifies system assembly and maintenance, it also has great impact on system shock protection and vibration absorption. Rigid screw mounting may cause permanent damage to modules or to the computer's sophisticated internal structure when a portable system is hit forcefully. If there are no screws used for internal module mounting, such kind of permanent damage can be avoided. Modules tightly clamped between the upper and lower case assemblies in FIG. 1C will not get such kind of damage. The cushion pads installed under, above and behind each module will not only provide shock protection to each module, but also absorb vibrations from a harsh environment or from internal modules, such as a hard drive. Traditional screw mounting transmits such vibrations throughout the system.

FIG. 1C shows the final assembly of the portable computer system 1-1. The upper protruding ports of module 1-23, 1-24, 1-25 and 1-26 extend through the top openings 1-13 and can be accessed from the top. This upper protruding port design allows component vendors such as pointing device, cellular fax/modem, multimedia, speaker, etc, to design and develop modules with various user-accessible ports for different users. It also reduces system vendors' hard tooling and development costs because there is no need to fix such ports with their associated circuits in the external enclosure case design. This makes the new hard tooling and electronic design less complex.

FIG. 2 shows the construction of a basic full size module. It shows the front view, side view and bottom view of a full size module 2-1 having a module head 2-2, a substantially rectangular module body 2-3, and a female module connector 2-4 under the module head 2-2 for transmitting digital signals and power. A female module connector is more durable for module installation than a male module connector. Module body 2-3 has a substantially flat top side 2-5 and bottom side 2-6 for module clamping. The bottom side 2-8 of module head 2-2 where module connector 2-4 is installed is offset from the bottom side 2-6 of the module body 2-3 to make the module more compact. Further, the module connector 2-4 is positioned higher than the bottom side 2-6 so that it will not touch the bottom surface when placed externally and thus makes it easier to be kept clean and avoid damage. Module body 2-3 further has a flat and straight vertical front edge 2-7 between the bottom side 2-8 of the module head 2-2 and the bottom side 2-6 of the module body 2-3. The front edge 2-7 will be used to assist the mounting of the module in horizontal direction as discussed in FIGS. 7A–7D.

Figure 3A:
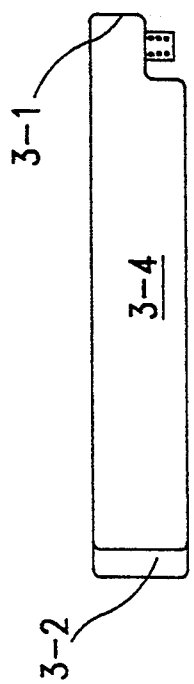
FIG. 3 shows the side, rear and bottom views of the construction of a full size module with a rear protruding port.
Figure 3B:
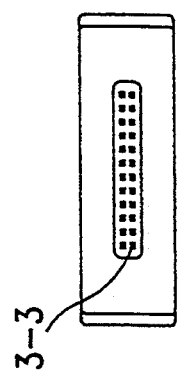
Figure 3C:
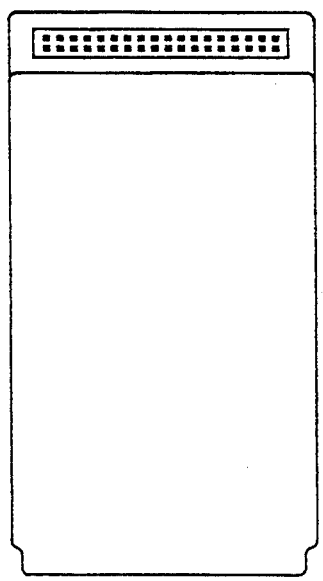
Figure 2B:
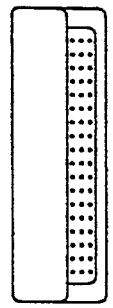
Figure 2A:
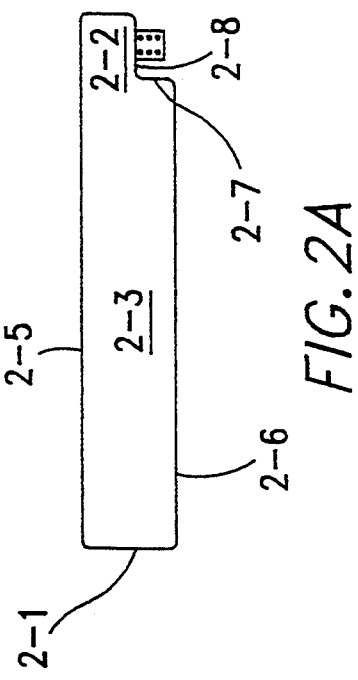
Figure 2C:
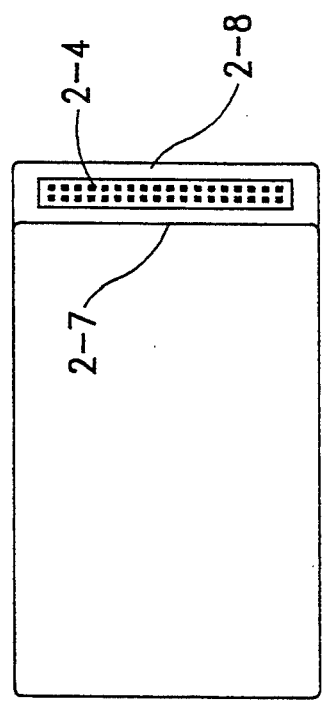

FIG. 3 shows the construction of a full size module with a rear protruding port. It shows the side view, rear view and bottom view of a full size module 3-1 with a substantially rectangular rear protruding port 3-2 which is narrower than module body 3-4 for easy mounting. There is a connector 3-3 installed on the rear protruding port for external connection. The mounting of module 3-1 is discussed in FIGS. 8A–8E.

FIG. 4 shows the construction of a full size module with an upper protruding port. It shows the top view, front view and side view of a full size module 4-1 with an upper protruding port 4-2. In this example, speaker 4-3 is installed on the upper protruding port 4-2. The mounting of module 4-1 is discussed in FIG. 9.

FIGS. 5A–5B shows a full size module with a front end latching means and its connection to a receptacle. FIG. 5A shows the construction of this module. It shows the top view, front view and side view of a full size module 5-1 with two elastic clip devices 5-2 installed on left and right hand sides of its module head 5-9. FIG. 5B shows the detailed construction of the elastic clip devices 5-2 and a receptacle 5-5 connected it. Each elastic clip device 5-2 has a hook device 5-4 on its lower end, a handle 5-7 on its upper end for releasing the clip device, a joint 5-8 with a clip stop on its lower end, and a spring 5-3 for supporting the clip device. The hook device 5-4 of module 5-1 engages and securely latches to a correspondent hook receiving device 5-6 of receptacle 5-5 to prevent loose connection between module head 5-9 and receptacle 5-5. Each clip device 5-2 can be released by pressing the handle 5-7 inwardly and the whole module head 5-9 can be released and removed from receptacle 5-5 by pressing and pulling both handles 5-7 in the same time. The front end latching means not only secures the module connection, but also allows module designers to use low-profile module connectors to make the whole module more compact, or use low insertion force module connectors to facilitate the installation and removal of such modules.

Figure 6A:
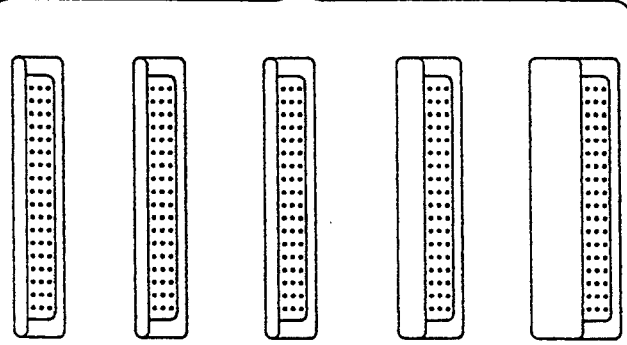
FIG. 6 shows the front and side views of five module assemblies with various form factors.
Figure 6B:
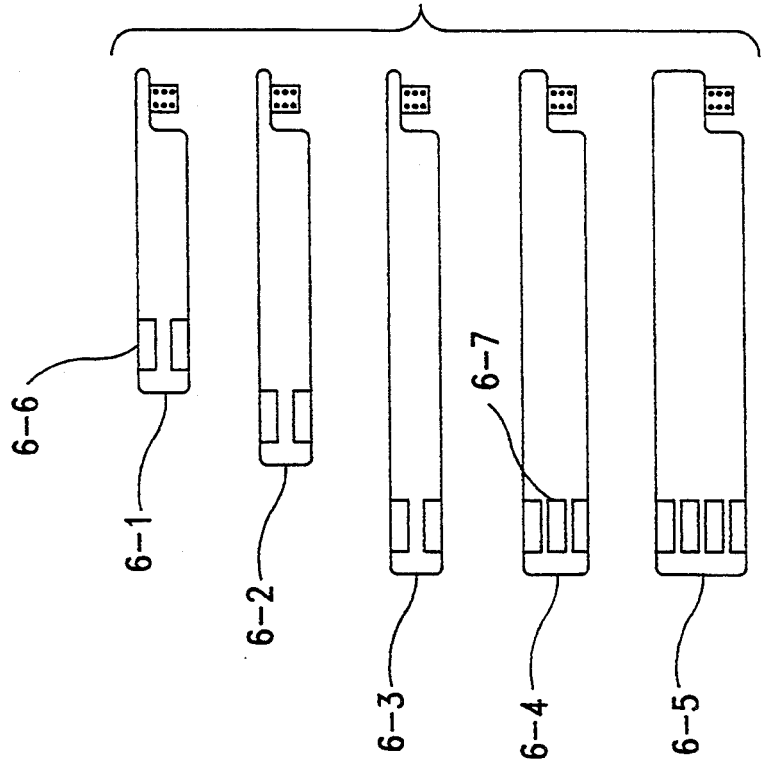

FIG. 6 illustrates a systematic method for module size variation. It shows the front views and side views of five different modules: module 6-1, a half height and half length module, module 6-2, a half height and two-third length module, module 6-3, a half height and full length module, module 6-4, a three-fourth height and full length module, and module 6-5, a full height and full length module. The height of module 6-1 is equal to two commercially available memory cards' height plus an air ventilation gap height, which is represented as mark 6-6 on the side of module 6-1. Similarly, mark 6-7 of module 6-4 represents three memory cards' height plus two air ventilation gaps' height, and so on. Any two modules stacked together as a composite module can always keep an air ventilation gap in between, and can be mounted like an integral module with the same height. Examples of such composite modules and their mountings will be shown from FIGS. 15A–15D to FIGS. 19A–19D. Systematic size variation makes it much easier to design external enclosure cases and related module mounting devices.

Figure 7A:
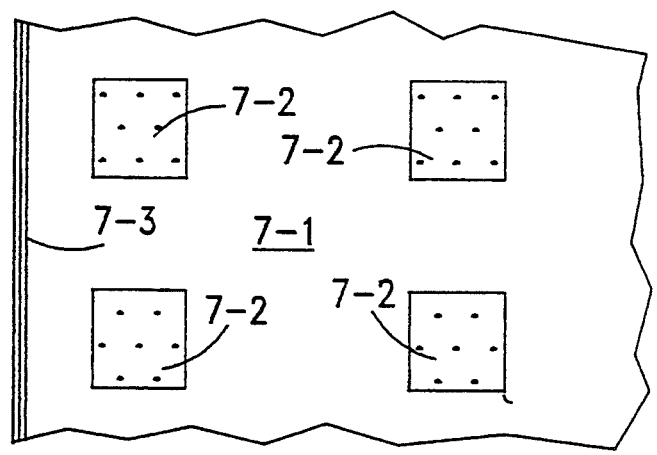
FIGS. 7A–7D illustrates mounting a full size module inside an external enclosure case.
Figure 7B:
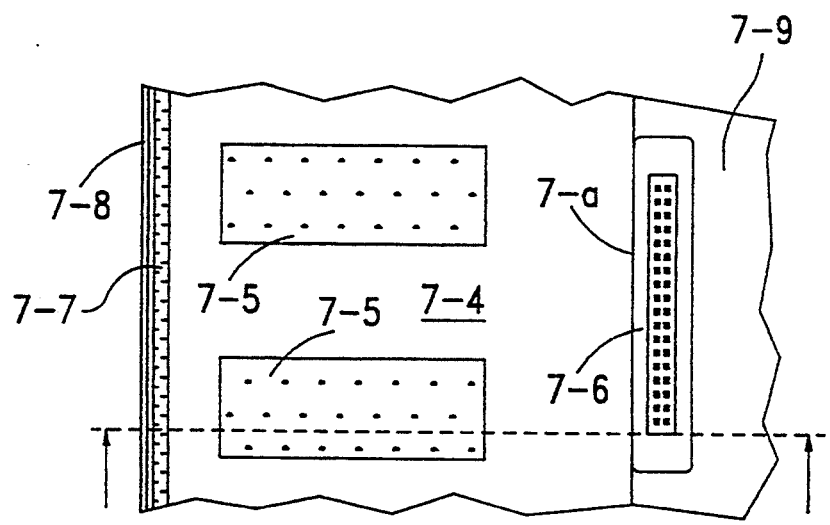
Figure 7C:
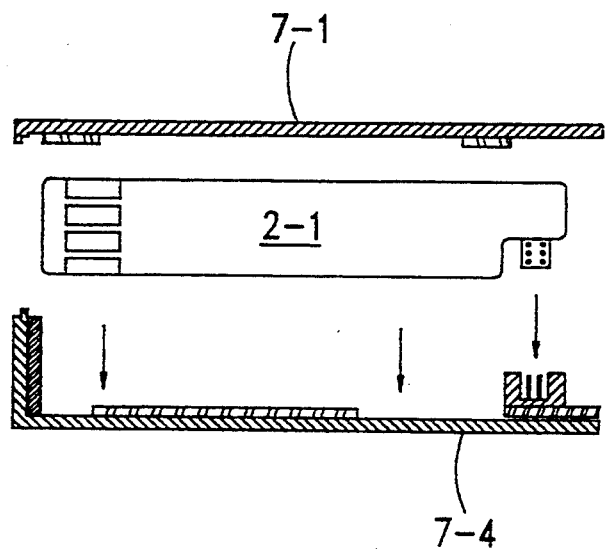
Figure 7D:
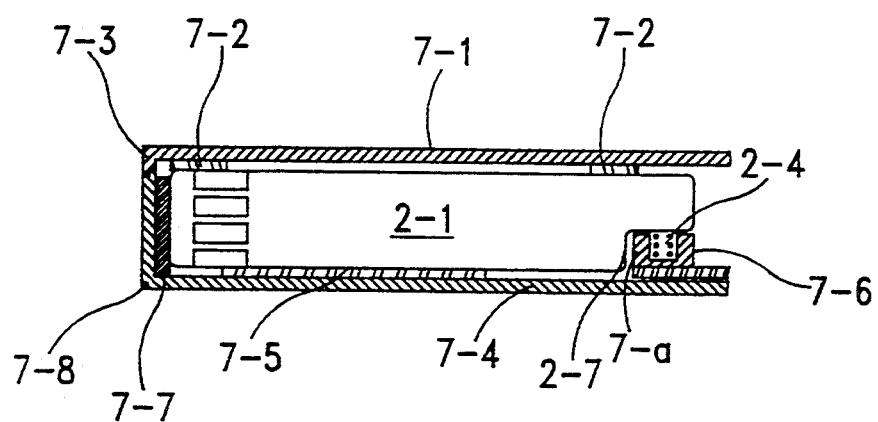

FIGS. 7A–7D shows a basic mounting design for a full size module. FIG. 7A and FIG. 7B show the construction of an upper case assembly and a lower case assembly. FIG. 7A is a bottom view of part of an upper case assembly 7-1 and FIG. 7B is a top view of part of a lower case assembly 7-4. Upper case assembly 7-1 has a side panel 7-3 and four cushion pads 7-2 on its top panel for clamping a module's upper end. Lower case assembly 7-4 has two cushion pads 7-5 on its bottom panel and one cushion pad 7-7 on its side panel 7-8 for module clamping, and a male BUS receptacle 7-6 installed on a PCB board 7-9 with a flat and straight vertical edge 7-a in its front end. FIG. 7C shows that a module and upper case assembly can be vertically mounted on or removed from lower case assembly. It is a side section view of upper case assembly 7-1 and lower case assembly 7-4 and a side view of module 2-1 in a disassembled form. FIG. 7D shows how the module is clamped between upper and lower case assemblies. It shows a side section view of upper case assembly 7-1 and lower case assembly 7-4, and a side view of module 2-1 wherein module 2-1 is clamped in between. Upper case assembly 7-1 is attached to lower case assembly 7-4 over the upper side panel 7-3 and lower side panel 7-8. Module 2-1 is "held" inside the case by the support from upper cushion pads 7-2, lower cushion pads 7-5, rear cushion pad 7-7 and front BUS receptacle 7-6. Module connector 2-4 is vertically plugged in BUS receptacle 7-6 and this connection itself is part of the overall mounting design which fixes module 2-1 inside the external case assembly horizontally. Front edge 2-7 of module 2-1 engages and securely attaches to the correspondent flat and straight vertical edge 7-a of BUS receptacle 7-6 to assist the module mounting in horizontal direction. The rear end of module 2-1 engages and securely attaches to the rear cushion pad 7-7 of side panel 7-8. The rear cushion pad 7-7 reliably supports the rear end of module 2-1 and prevents it from moving in horizontal direction.

The cushion pads 7-2, and 7-7 are installed over the module contacting parts of the external enclosure case to enhance the module clamping and provide the shock protection to module 2-1. Heat dissipation is a big concern over these cushion pads design. These cushion pads are made by rubber-like material. It is not a good heat conductive material so the size of such cushion pads should be small to prevent an overheating problem of contacting parts. On the other hand, if a cushion pad is made of metallic material, it can be used as a heat sink to conduct and dissipate heat from a module. FIGS. 23A–23C shows an example of a metallic cushion pad design. Heat generated from a module can be conducted through such metallic cushion means to a metallic enclosure case and uses it as a big heat sink.

FIGS. 8A–8E illustrates a basic mounting design for a full size module with a rear protruding port. FIG. 8A and FIG. 8B shows the construction of an upper case assembly and lower case assembly. FIG. 8A is a bottom view of part of an upper case assembly 8-1 which is similar to upper case assembly 7-1 except that it has a different side panel 8-3 for clamping the upper end of a rear protruding port. FIG. 8B is a top view of part of a lower case assembly 8-4 which is similar to lower case assembly 7-4 except that it has a U-shaped side opening 8-6 over the upper edge of side panel 8-5 with protruding edge 8-7 on three sides. FIG. 8C shows how the module is mounted on the lower case assembly. It is a top view of lower case assembly 8-4 with module 3-1 loaded on top of it. The rear protruding port 3-2 of module 3-1 engages and securely attaches to the side opening 8-6 of the lower case assembly 8-4 in a removable manner whereby module 3-1 can be vertically mounted on or removed from lower case assembly 8-4 when upper case assembly 8-1 is removed. FIG. 8D shows that module 3-1 and upper case assembly 8-1 can be vertically mounted on or removed from lower case assembly 8-4. The side view of FIG. 8D is a side section view of upper case assembly 8-1 and lower case assembly 8-4 and a side view of module 3-1 in a disassembled form. The rear view of FIG. 8D shows the disassembled upper case assembly 8-1, lower case assembly 8-4, and module 3-1. FIG. 8E shows how module 3-1 is clamped between upper case assembly 8-1 and lower case assembly 8-4. The side view of FIG. 8E is a side section view of upper case assembly 8-1 and lower case assembly 8-4, and a side view of module 3-1 wherein the rear protruding port 3-2 of module 3-1 is clamped between the side panel 8-3 of upper case assembly 8-1 and side opening 8-6 of lower case assembly 8-4. The rear view of FIG. 8E shows that the rear protruding port 3-2 of module 3-1 clamped between the side panel 8-3 of upper case assembly 8-1 and side opening 8-6 of lower case assembly 8-4 and can be accessed externally.

Figure 9A:
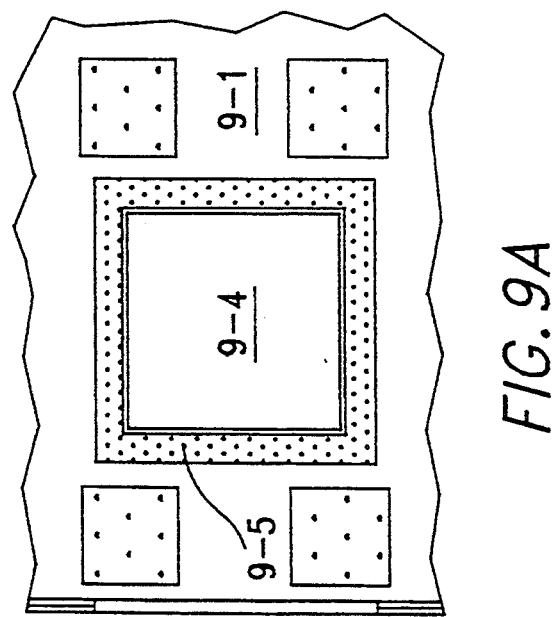
FIGS. 9A–9C illustrates mounting a full size module having both rear and upper protruding ports inside an external enclosure case.
Figure 9B:
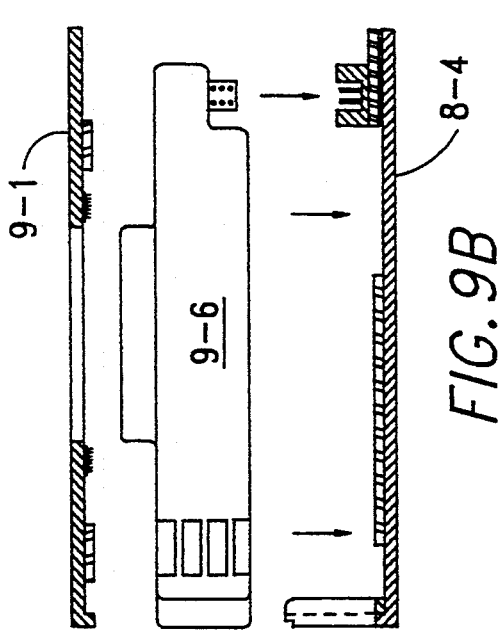
Figure 9C:
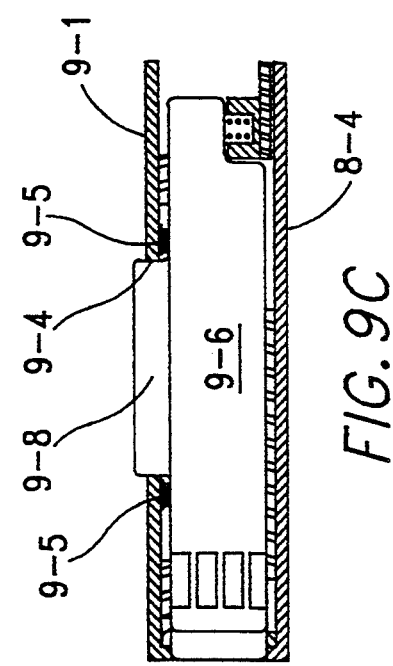

FIGS. 9A–9C shows a basic mounting design for a full size module with both rear and upper protruding ports. FIG. 9A shows the construction of an upper case assembly for mounting this module. FIG. 9A is a bottom view of part of an upper case assembly 9-1 which is similar to upper case assembly 8-1 except that it has a top opening 9-4 and a cushion means 9-5 around top opening 9-4. FIG. 9B shows that upper case assembly 9-1 and module 9-6 can be vertically mounted on or removed from lower case assembly 8-4. It is a side section view of upper case assembly 9-1 and lower case assembly 8-4 and a side view of module 9-6 in a disassembled form. FIG. 9C shows how module 9-6 is clamped between upper case assembly 9-1 and lower case assembly 8-4. FIG. 9C is a side section view of upper case assembly 9-1, lower case assembly 8-4, and a side view of module 9-6 wherein module 9-6 is clamped in between with its upper protruding port 9-8 extending through top opening 9-4 of upper case assembly 9-1. Cushion 9-5 installed around the inner side of top opening 9-4 of upper case assembly 9-1 engages and securely attaches to the surrounding part of upper protruding port 9-8 of module 9-6. Cushion 9-5 is made of metallic material and its main purpose is to provide electromagnetic interference (EMI) and radio frequency interference (RFI) protection to the system, although it can also be used for mounting purposes.

Figure 10A:
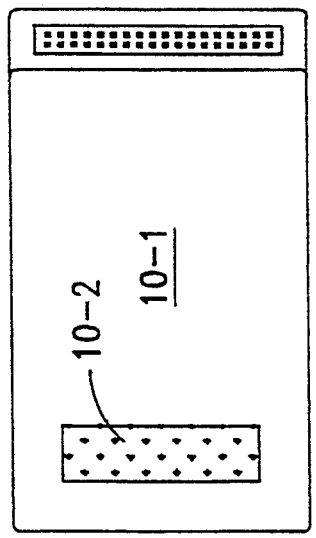
FIGS. 10A–10D illustrates mounting a full size module by using sticking means.
Figure 10B:
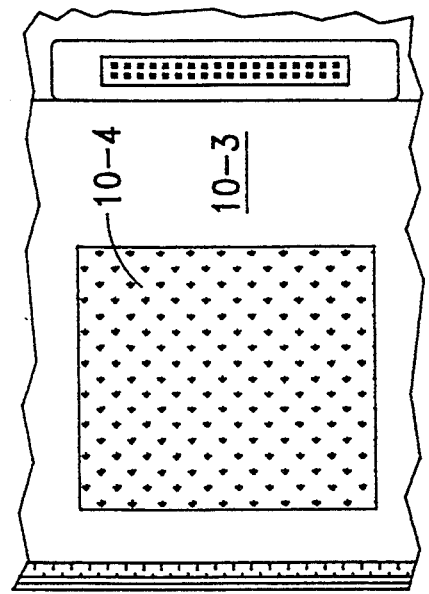
Figure 10C:
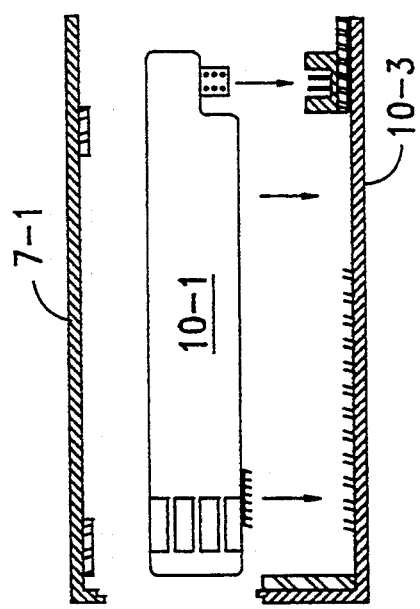
Figure 10D:
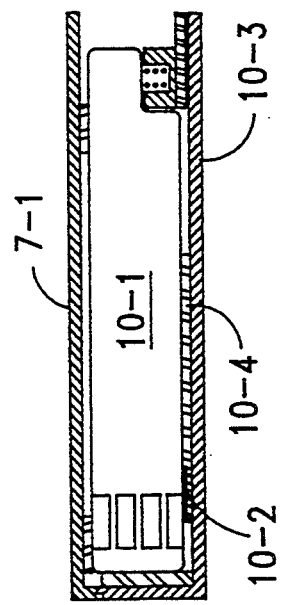

FIGS. 10A–10D illustrates use of a sticking means for module mounting. FIG. 10A shows the construction of a full size module with a sticking means on its rear bottom. It is a bottom view of a full size module 10-1 with a sticking means 10-2 installed on the substantially flat module clamping zone of its lower end. FIG. 10B shows the construction of a lower case assembly with the correspondent sticking receiving means for module installation. It is a top view of part of a lower case assembly 10-3 with a sticking receiving means 10-4 installed on the substantially flat case clamping zone of its bottom panel. Sticking receiving means 10-4 can also function as a cushion pad for modules with or without sticking means. FIG. 10C shows that module 10-1 and upper case assembly 7-1 can be vertically mounted on or removed from lower case assembly 10-3. It is a side section view of upper case assembly 7-1 and lower case assembly 10-3, and a side view of module 10-1 in a disassembled form. FIG. 10D shows how the module is clamped between the upper and lower case assemblies. It is a side section view of upper case assembly 7-1, lower case assembly 10-3, and a side view of module 10-1 wherein module 10-1 is clamped in between with its bottom end engaged and securely stuck to the sticking receiving means 10-4 of lower case assembly 10-3 in a removable manner whereby the module body of module 10-1 is reliably mounted on the lower case assembly 10-4. The advantage of using a sticking means on the lower case assembly for module mounting is that it reduces the reliance on the upper case assembly to secure the modules. The module mounting mechanisms mentioned in FIGS. 7A-7D, FIGS. 8A-8E, and FIGS. 9A-9C can also utilize this sticking means to secure the module mounting. If the front end of the module connection is secured in the same time, there is no need at all for upper case clamping and the restriction over module's form factor can be reduced to the minimum as long as the module is small enough to fit into an external enclosure case. This will be illustrated in FIGS. 13A-13C. One example of such sticking material is marketed under the trademark VELCRO.

Figure 11A:
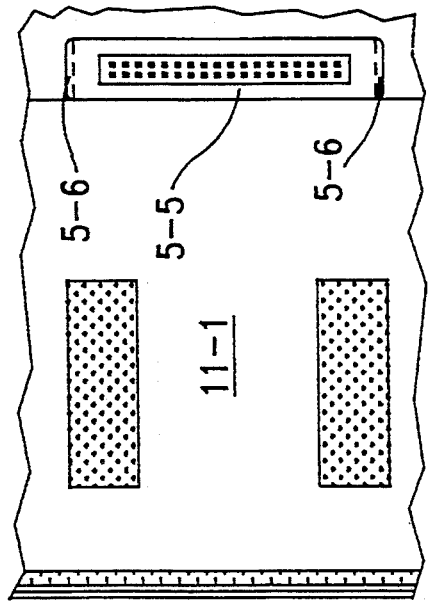
FIGS. 11A–11D illustrates mounting a full size module by elastic clip devices on its module head.
Figure 11B:
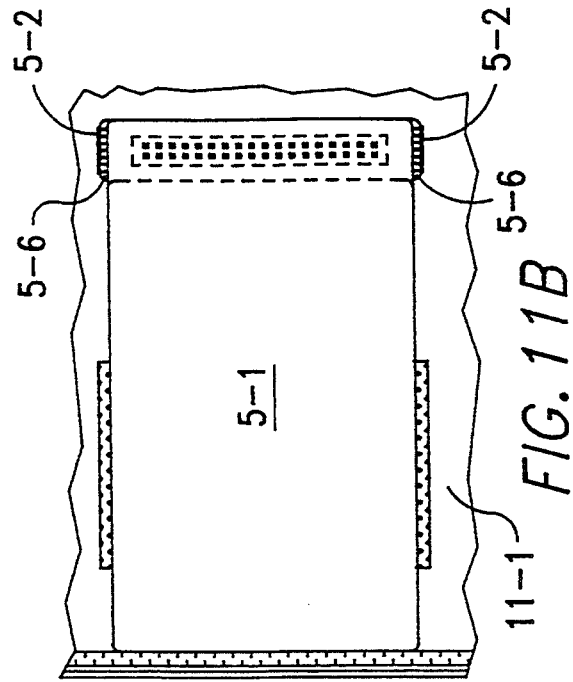
Figure 11C:
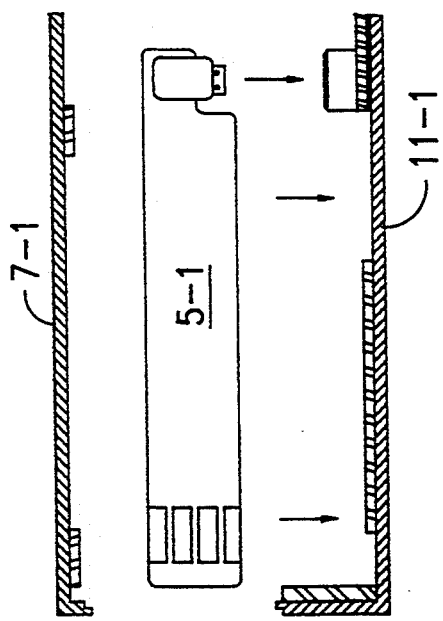
Figure 11D:
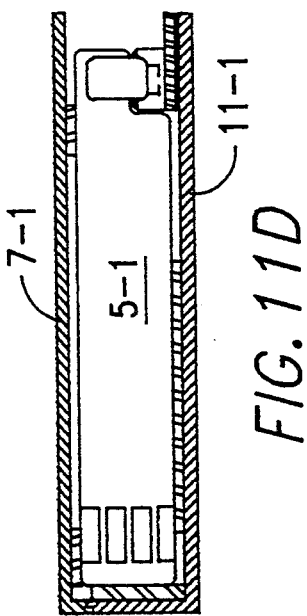

FIGS. 11A-11D illustrates using a front end latching means to assist the module mounting. FIG. 11A shows the construction of a lower case assembly with a latch receiving means in its front end. It is a top view of part of a lower case assembly 11-1 which is similar to lower case assembly 7-4 except that it uses receptacle 5-5 of FIG. 5B which has two hook receiving devices 5-6 on both sides. FIG. 11B shows how module 5-1 is mounted on lower case assembly 11-1. It is a top view of lower case assembly 11-1 loaded with module 5-1. The two elastic clip devices 5-2 of module 5-1 hook to the hook receiving devices 5-6 of BUS receptacle 5-5. FIG. 11C shows how module 5-1 and upper case assembly 7-1 can be vertically mounted on or removed from lower case assembly 11-1. It is a side section view of upper case assembly 7-1 and lower case assembly 11-1, and a side view of module 5-1 in a disassembled form. FIG. 11D shows how module 5-1 is clamped between upper case assembly 7-1 and lower case assembly 11-1. It shows a side section view of upper case assembly 7-1 and lower case assembly 11-1, and a side view of module 5-1 wherein module 5-1 is clamped in between. Just like the sticking means in FIGS. 10A-10D, the front end latching means can help all the module mounting mechanisms mentioned previously to secure the front end connection between module connector and BUS receptacle and thus makes it rely less on the case clamping zones of the upper case assembly for module clamping.

Figure 12A:
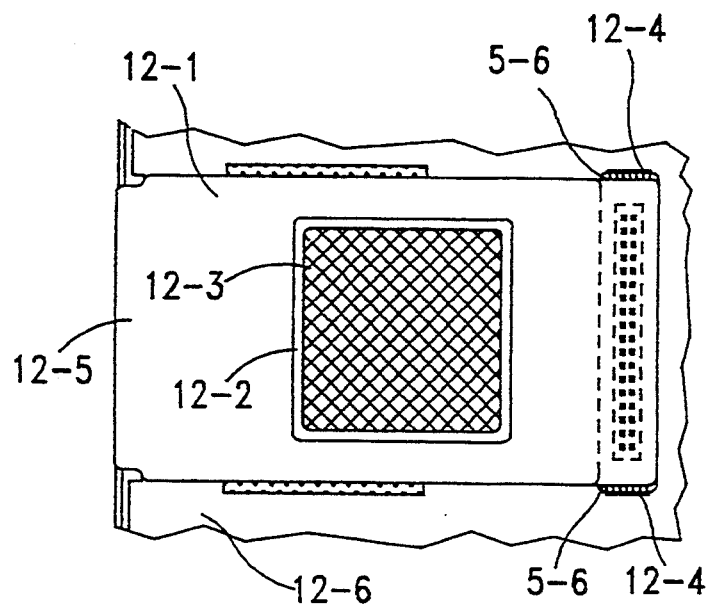
FIGS. 12A–12C illustrates that a module with front end latching means and rear protruding port can totally eliminate the need for upper case clamping zones.
Figure 12B:
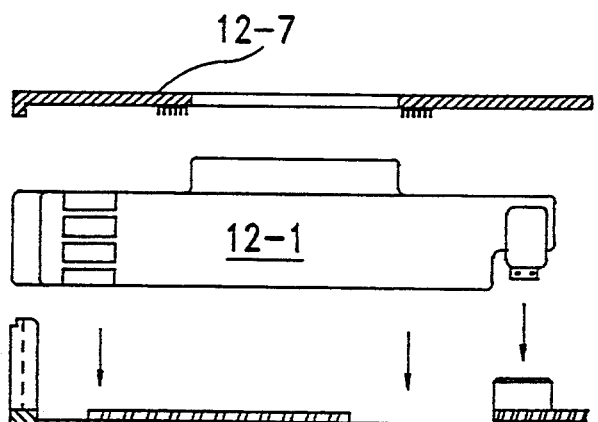
Figure 12C:
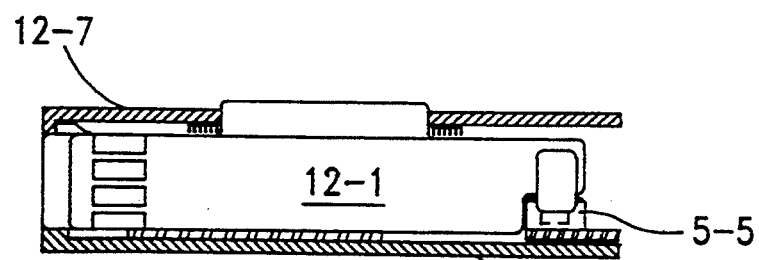

FIGS. 12A-12C shows that a module with a front end latching means and a rear protruding port can totally eliminate the need for upper case clamping zones. FIG. 12A shows how module 12-1 is mounted on lower case assembly 12-6. It is a top view of lower case assembly 12-6 loaded with module 12-1. Lower case assembly 12-6 is similar to lower case assembly 8-4 except that it uses receptacle 5-5 of FIG. 5B which has two hook receiving devices 5-6 on both sides. Module 12-1 has a speaker 12-3 on its upper protruding port 12-2, two elastic clip devices 12-4, and one rear protruding port 12-5. Two elastic clip devices 12-4 are hooked to hook receiving devices 5-6 of BUS receptacle 5-5. FIG. 12B shows that module 12-1 and upper case assembly 12-7 can be vertically mounted on or removed from lower case assembly 12-6. It is a side section view of upper case assembly 12-7 and lower case assembly 12-6, and a side view of module 12-1 in a disassembled form. Upper case assembly 12-7 is the same as upper case assembly 9-1 except that it has no cushion pads for module clamping. FIG. 12C shows how module 12-1 is clamped between upper case assembly 12-7 and lower case assembly 12-6. It is a side section view of upper case assembly 12-7 and lower case assembly 12-6, and a side view of module 12-1 wherein module 12-1 is clamped in between and its front end is tightly latched to BUS receptacle 5-5. FIGS. 12A-12C shows that the reliance on the case clamping zones of the upper case assembly can totally be eliminated for those modules mounted inside the case by front end latching means and rear protruding port clamping.

Figure 13A:
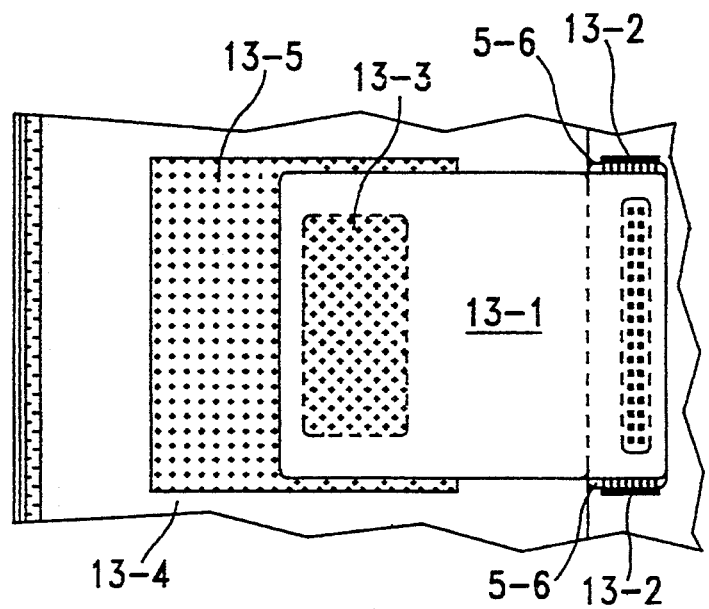
FIGS. 13A–13C illustrates mounting a small module by front end latching means and rear end sticking means.
Figure 13B:
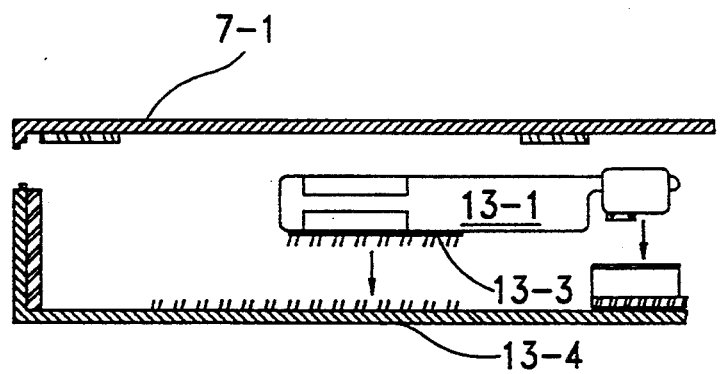
Figure 13C:
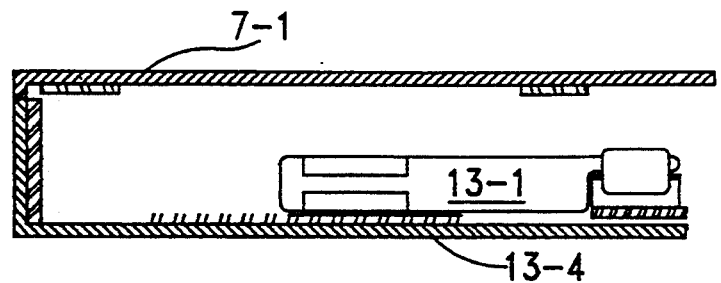

FIGS. 13A-13C shows the mounting of a small module purely by using front end latching means and rear end sticking means. FIG. 13A shows how module 13-1 is mounted on lower case assembly 13-4. It is a top view of lower case assembly 13-4 with a sticking receiving means 13-5 installed on its bottom, and a half height, two-third length module 13-1 mounted on top of it. Module 13-1 has two elastic clip devices 13-2 on its front and a rear end sticking means 13-3 on its rear bottom (shaded area). Lower case assembly 13-4 is similar to lower case assembly 10-3 of FIG. 10B except that it uses receptacle 5-5 of FIG. 5B which has two hook receiving devices 5-6 on both sides. FIG. 13B shows that module 13-1 and upper case assembly 7-1 can be vertically mounted on or removed from lower case assembly 13-4. It is a side section view of upper case assembly 7-1 and lower case assembly 13-4, and a side view of module 13-1 in a disassembled form. FIG. 13C shows how module 13-1 is secured to the lower case assembly without the clamping of the upper case assembly. It is a side section view of upper case assembly 7-1 and lower case assembly 13-4, and a side view of module 13-1 wherein module 13-1 is mounted on lower case assembly purely by front end latching means and rear end sticking means, without the additional clamping of the upper case assembly or side panel. FIGS. 13A-13C shows a very convenient and useful method for those electronic systems for which it is difficult to build an upper case assembly to clamp the upper end of a module to the lower case assembly. It also shows that the form factor of module 13-1 can vary continuously as long as it is small enough to fit in the external enclosure case. For some small and light modules, the rear end sticking means can even be eliminated and the whole module can be supported only by the front end latching means.

Figure 14A:
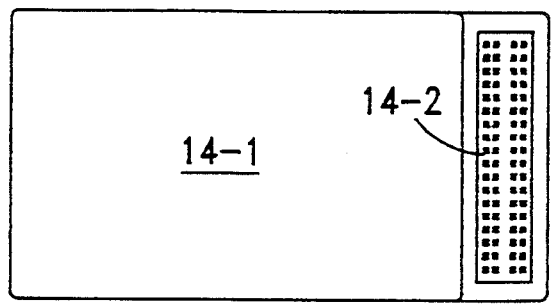
FIGS. 14A–14D illustrates an extended module connector.
Figure 14B:
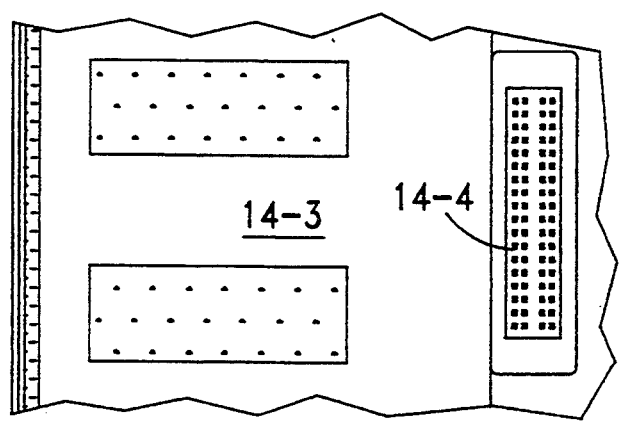
Figure 14C:
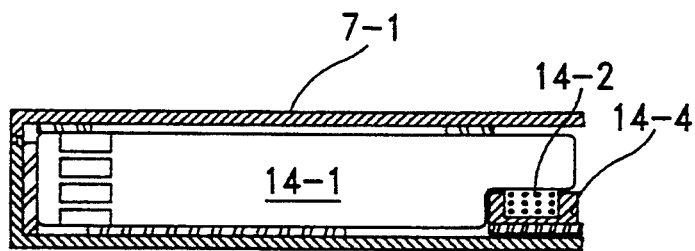
Figure 14D:
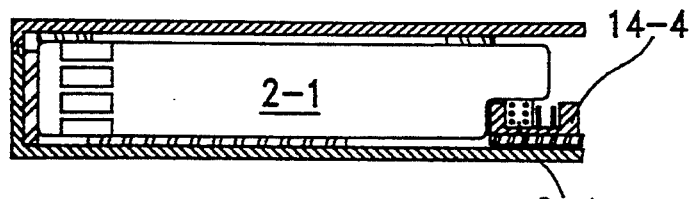

FIGS. 14A-14D illustrates how a module connector can be extended while still maintaining compatibility with the standard module connector. FIG. 14A is a bottom view of a full size module 14-1 with an extended female module connector 14-2. FIG. 14B is a top view of part of a lower case assembly 14-3 with an extended male BUS receptacle 14-4 in its front end. FIG. 14C shows how module 14-1 is clamped between upper case assembly 7-1 and lower case assembly 14-3. It is a side section view of upper case assembly 7-1 and lower case assembly 14-3, and a side view of module 14-1 with the extended module connector 14-2 plugged in the extended BUS receptacle 14-4. FIG. 14D shows a comparison to FIG. 14C wherein module 2-1 with a standard module connector 2-4 is plugged in the extended BUS receptacle 14-4. Compatible BUS architectures such as ISA and EISA can be implemented in this way. Using vertical module connectors in a module's front end allows module designers to use high density connectors and/or to expand an existing connector easily, especially as compared with the horizontal connectors used in many commercially available memory cards.

FIGS. 15A-15D illustrates how a small module is mounted in a bigger external enclosure case using a mounting kit. FIG. 15A shows the construction of a half height mounting kit. It shows the front view, side view and bottom view of a half height mounting kit 15-1 with two pairs of holding arms 15-2 on its left and right hand sides. For each holding arm 15-2, there is a cushion pad 15-3 installed in its inner side for securing the module mounted under it. Four flat and protruding clamping zones 15-4 are devised for supporting full length module mounted under it and two similar clamping zones 15-5 located in the middle are devised to support half length or two-third length modules. FIG. 15B shows a composite module created using this mounting kit. It is the front view and side view of a composite module 15-7 created by stacking mounting kit 15-1 on top of a half height module 6-3. Two holding arms 15-2 on the left and right hand sides of mounting kit 15-1 reliably holds two correspondent sides of module 6-3 in a removable manner. Cushion pad 15-3 inside each holding arm 15-2 increases its holding power and allows mounting kit 15-1 and module 6-3 tightly hold together. Air ventilation gap 15-6 is created by the protruding clamping zones 15-4 and 15-5 for heat dissipation. The height of composite module 15-7 is equal to a full height module and thus can be clamped like an integral full height module. There is no cushion pad installed under clamping zones 15-4 and 15-5, so that the height of composite module 15-7 can be more accurately controlled. FIG. 15C shows how composite module 15-7 is mounted on lower case assembly 7-4. It is a top view of lower case assembly 7-4 with composite module 15-7 installed on top of it. The front mounting arms 15-2 of mounting kit 15-1 attach directly to the vertical edge 7-a of BUS receptacle 7-6 and the rear end of mounting kit 15-1 attaches directly to the rear cushion pad 7-7 so that mounting kit 15-1 can be reliably secured in between and will not slide back and forth. FIG. 15D shows how composite module 15-7 is clamped between upper case assembly 7-1 and lower case assembly 7-4. It is a side section view of upper case assembly 7-1 and lower case assembly 7-4, and a side view of composite module 15-7 wherein composite module 15-7 is reliably clamped in between, just like the integral full size module 2-1 in FIG. 7D.

FIGS. 16A-16D illustrates another type of mounting kit which has a rear protruding port. FIG. 16A shows the construction of this mounting kit. It shows the front view, side view, rear view and bottom view of mounting kit 16-1 which has a rear protruding port 16-2 and two pairs of holding arms 16-3. Mounting kit 16-1 is essentially the same as mounting kit 15-1 except that it has a rear protruding port. Two clamping zones 16-7 located in the middle of mounting kit 16-1 are devised to support half length or two-third length modules. FIG. 16B shows a composite module created by using mounting kit 16-1. It shows the side view and rear view of composite module 16-6 created by stacking mounting kit 16-1 on top of a half height module 16-4 which has a rear protruding port 16-5. The rear protruding port 16-2 of mounting kit 16-1 stacks directly on top of rear protruding port 16-5 of module 16-4 and there is no air ventilation gap in between. The rear view of composite module 16-6 shows how both rear protruding ports 16-2 and 16-5 are stacked together. FIG. 16C shows how composite module 16-6 is mounted on lower case assembly 8-4. It is a top view of lower case assembly 8-4 with composite module 16-6 installed on top of it. The mounting method is the same as the integral module 3-1 in FIG. 8C. FIG. 16D shows how composite module 16-6 is clamped between upper case assembly 8-1 and lower case assembly 8-4. It is a side section view of upper case assembly 8-1 and lower case assembly 8-4, and a side view of composite module 16-6 wherein composite module 16-6 is clamped in between, just like the integral module 3-1 in FIG. 8E.

FIGS. 17A-17E illustrates how to use an adapter and a mounting kit to mount a small module in a bigger external enclosure case. FIG. 17A shows the construction of a small module 17-1. It shows the side view, rear view and bottom view of module 17-1 having a rear protruding port 17-2 with a male receptacle 17-3 for transmitting signals and power. FIG. 17B shows the construction of an adapter for module 17-1. It shows the side view and bottom view of adapter 17-4 with a female connector 17-5 on its front end and a rear protruding port 17-6. FIG. 17C shows how module 17-1 and adapter 17-4 is connected. It shows the side view and bottom view of module 17-1 connected with adapter 17-4 on its rear end. Connector 17-5 of adapter 17-4 engages and securely plugs in receptacle 17-3 of module 17-1. FIG. 17D shows the construction of a composite module 17-7 created by stacking mounting kit 16-1 on top of module 17-1 and adapter 17-4. It shows the side view and rear view of the composite module. FIG. 17E shows how composite module 17-7 is clamped between upper case assembly 8-1 and lower case assembly 8-4. It is a side section view and a rear view of upper case assembly 8-1 and lower case assembly 8-4 with composite module 17-7 clamped in between. The rear end of module 17-1 is clamped between clamping zone 16-7 of mounting kit 16-1 on its top side and cushion pad 8-8 of lower case assembly 8-4 on its bottom side so that it will not bounce up. This makes the structure of composite module 17-7 more reliable.

FIGS. 18A-18E illustrates an example of a composite module with a changeable upper protruding port. FIG. 18A shows the construction of a small module with upper protruding port. It shows the front view, side view and bottom view of a small half height module 18-1 with an upper protruding port 18-3, a narrow groove 18-c on each side of module 18-1 as a latch receiving means for holding arms 18-7, and a male connector 18-2 on its rear bottom end for transmitting signals and power. FIG. 18B shows the construction of a base module for module 18-1. It shows the top view, front view and side view of module 18-4 with a rear protruding port 18-6, upper female receptacle 18-5, two upward holding arms 18-7 with protruding edges 18-b as a latching means, and two clamping zones 18-9. FIG.

18C shows the top view, front view and side view of composite module 18-8 created by latching module 18-1 on top of module 18-4. The latching means 18-b of holding arms 18-7 engage and securely latch to the latch receiving means 18-c on both sides of module 18-1 in a removable manner. Such kind of tight coupling strengthens a composite module's structure and make it possible to mount it like an integral module. An integral module can use the front end latching means, rear end sticking means, or rear protruding port clamping to reduce its reliance on the clamping zones of the upper case assembly for module clamping while a loosely coupled composite module can not. Other composite modules mentioned in FIGS. 15A–15D, FIGS. 16–16D, FIGS. 17A–17E and FIGS. 19A–19D can also use this method to enhance their structures. In this example, module 18-1 has a speaker 18-a on its upper protruding port 18-3. FIG. 18D shows how composite module 18-8 is mounted on a lower case assembly 8-4. It is a top view of lower case assembly 8-4 with composite module 18-8 mounted on top. FIG. 18E shows how composite module 18-8 is clamped between upper case assembly 9-1 and lower case assembly 8-4. It is a side section view of upper case assembly 9-1 and lower case assembly 8-4 and a side view of composite 18-8 wherein composite module 18-8 is clamped in between. FIGS. 18A–18E shows that the upper protruding port of such composite modules can be easily changed by using different upper modules.

Figure 19C:
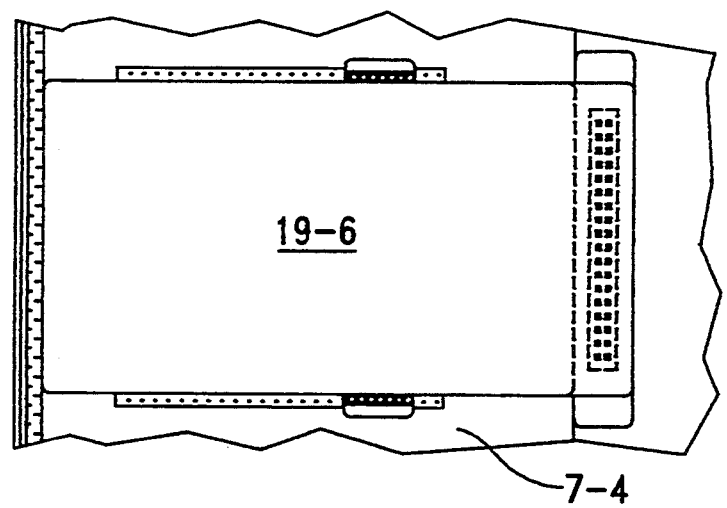
Figure 19D:
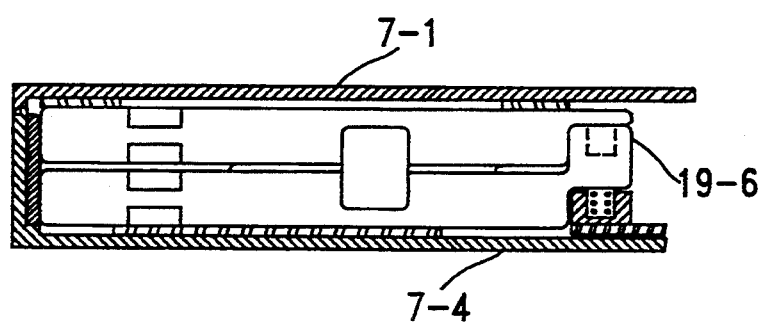

FIGS. 19A–19D illustrates a composite module made by stacking a standard small module on top of a base module. FIG. 19A shows the construction of a base module with a receptacle on top of its module head. It shows the top view, front view, side view, and rear view of base module 19-1 with a standard receptacle 19-2 on top of its module head for transmitting digital signals and power. Module 19-1 further contains two upward holding arms 19-3 each with a cushion pad 19-4 in its inner side, and three clamp zones 19-5. The construction of the upper receptacle 19-2 of module 19-1 is essentially the same as receptacle 7-6 of FIG. 7B. FIG. 19B shows how a composite module is created using module 19-1. It shows the top view, front view, side view, and rear view of composite module 19-6 created by stacking a half height module 6-3 on top of base module 19-1. FIG. 19C shows how the composite module is mounted in a lower case. It is a top view of lower case assembly 7-4 with composite module 19-6 installed on top. FIG. 19D shows how the composite module is clamped inside an external enclosure case. It is a side section view of upper case assembly 7-1 and lower case assembly 7-4 with composite module 19-6 clamped in between.

FIGS. 19A–19D illustrates that a small module like 6-3 can adapt to a bigger external enclosure case by plugging it in on top of a base module like 19-1. If module 6-3 has an upper protruding port, it can also use this method to form a new composite module which adapts to a full height external enclosure case with a top opening for the upper protruding port. Example in FIGS. 17A–17E shows that a small module with a rear I/O port can adapt to a full height external enclosure case by use of adapters and mounting kits. And the example in FIGS. 13A–13C shows how a small module with no I/O port can be installed in a full height external enclosure case by using front end latching means and rear end sticking means. These three examples illustrate that a small and short module with standard module connector, usually used in smaller external enclosure cases like palmtop computers, can always adapt to a bigger external enclosure case such as a notebook computer, no matter whether it has a rear protruding port, an upper protruding port, or none, or both.

Figure 20B:
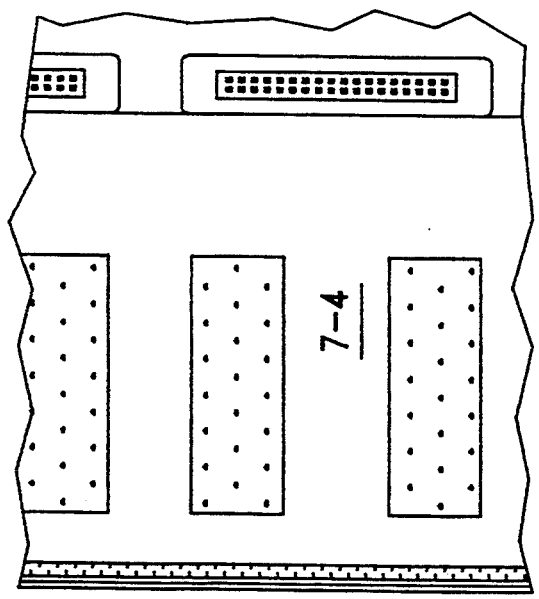
Figure 20D:
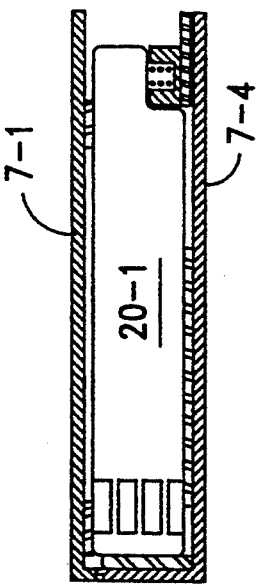
Figure 20C:
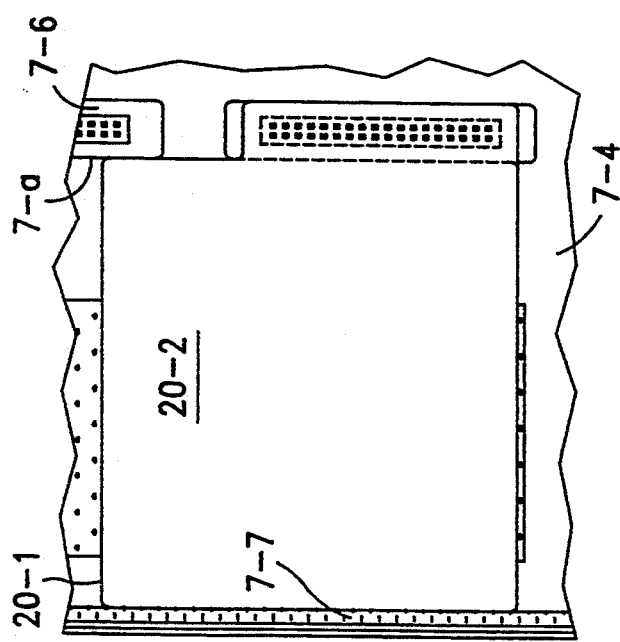

FIGS. 20A–20D illustrates how module size can be expanded without creating a mounting problem. FIG. 20A shows the construction of an oversize module. It shows the front view, side view, and bottom view of an oversize module 20-1 with an oversize portion 20-2. FIG. 20B shows a top view of lower case assembly 7-4 for mounting module 20-1. FIG. 20C shows how the oversize module is mounted in a lower case assembly. It is a top view of lower case assembly 7-4 with module 20-1 installed on top. The front vertical edge 20-3 of module 20-1 attaches to the vertical edge 7-a of the neighboring BUS receptacle 7-6, and the rear side of the oversize module 20-1 attaches to the cushion pad 7-7 of lower case assembly 7-4. FIG. 20D shows how the oversize module is clamped in an external enclosure case. It shows a side section view of upper case assembly 7-1 and lower case assembly 7-4, and the side view of module 20-1 wherein module 20-1 is clamped in between. FIGS. 20A–20D illustrates that a module can expand its body sideways by using the same mounting mechanism in its neighboring slot. If the mounting space is available, a module can be designed to the maximum extent (width) of an external enclosure case without any mounting problem.

Figure 21C:
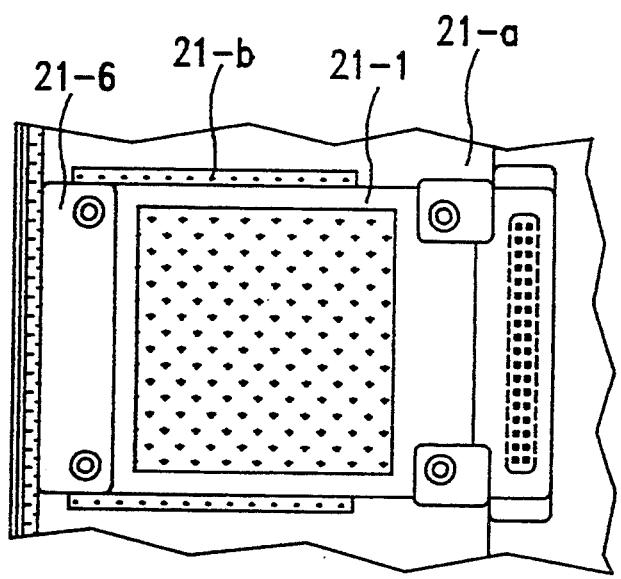
Figure 21D:
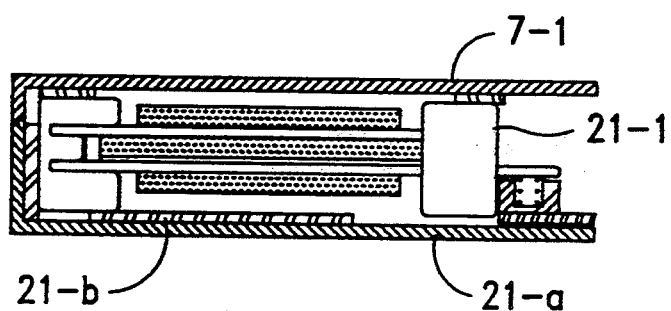

FIGS. 21A–21E illustrates that traditional PCB board assemblies can also be used as the main construction material in building modules devised for use in this invention. FIG. 21A illustrates the construction of a PCB module with no I/O port. It shows the front view, side view and bottom view of PCB module 21-1. Module 21-1 is constructed by two PCB board assemblies 21-3, one module connector 21-2 for transmitting digital signals and power, two shoulder PCB board mounting kits 21-4 fastened to PCB board assemblies 21-3 by fasteners 21-5, and one rear PCB board mounting kit 21-6 with two fasteners 21-5. PCB board assemblies 21-3 have three component sides 21-8 and are fastened together by PCB board mounting kits 21-4, 21-6, and fasteners 21-5. The top and bottom sides of three PCB board mounting kits are substantially flat for the purpose of module clamping and PCB board assemblies 21-3 of module 21-1 are horizontally supported by the PCB board mounting kits. Each shoulder PCB board mounting kit 21-4 has a flat vertical edge 21-9 in front. The front vertical edge 21-9 functions just like the front vertical edge 2-7 of module 2-1 in FIG. 7D. FIG. 21B illustrates the construction of another PCB module with both rear and upper protruding ports. FIG. 21B shows the top view, side view and rear view of PCB module 21-c with upper protruding port 21-d and rear protruding port 21-e. The upper protruding port 21-d is a control panel which has a LED display and six keys. FIG. 21C shows how PCB module 21-1 is mounted on a lower case assembly. It is a top view of lower case assembly 21-a with module 21-1 mounted on top of it. Lower case assembly 21-a is similar to lower case assembly 7-4 except that its cushion pads 21-b are longer in order to support the rear PCB board mounting kit 21-6 of module 21-1. FIG. 21D shows how PCB module 21-1 is clamped inside an external enclosure case. It is a side section view of upper case assembly 7-1 and lower case assembly 21-a and the side view of module 21-1 wherein module 21-1 is reliably clamped in between.

Figure 21E:
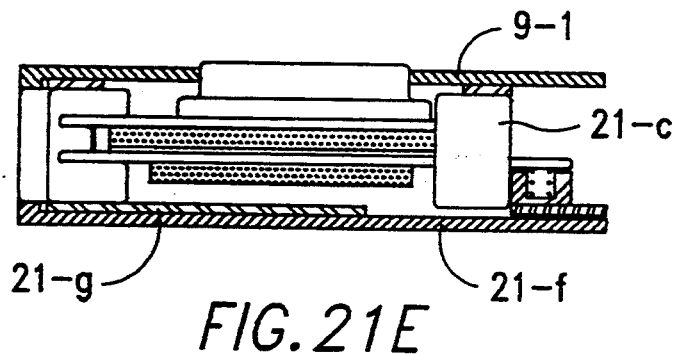

FIG. 21E shows the mounting of PCB module 21-c. It is a side section view of upper case assembly 9-1 and lower case assembly 21-f and the side view of module 21-c wherein module 21-c is clamped in between just like module 9-6 in FIG. 9C. Lower case assembly 21-f is similar to lower case assembly 8-4 except that its cushion pads 21-g are longer in order to support the rear PCB board mounting kit of module 21-c.

FIGS. 22A–22B illustrates the use of elastic springs as upper cushion means for module mounting. FIG. 22A shows the construction of such upper case assembly. It shows the side section view and the bottom view of upper case assembly 22-1 with four elastic springs 22-2 installed for module mounting. FIG. 22B shows how a full size module is clamped inside this external enclosure case. It is a side section view of upper case assembly 22-1 and lower case assembly 7-4 and the side view of module 2-1 wherein module 2-1 is clamped in between with the assistance of the upper elastic springs 22-2. Using elastic springs as upper cushion means not only can provide shock protection to modules mounted inside, but also allows tolerance of more module height differences than allowed by cushion pads made of rubber-like material.

Multiple modules clamped between upper and lower case assemblies may create one important problem: individual module's height tolerance. It is difficult to clamp all the modules between the upper and lower case assemblies in the same time if the modules' heights are not consistent. As an alternative to more accurate control over module height tolerance, FIGS. 22A–22B illustrates one way to solve this problem. Other methods to solve this problem by reducing the reliance on the upper case clamping zones include (1) using sticking means on the lower case assembly such as illustrated in FIGS. 10A–10D and FIGS. 13A–13C, (2) using front end latching means to prevent loose connections between the module connectors and the BUS receptacles as shown in FIGS. 11A–11D, FIGS. 12A–12C and FIGS. 13A–13C, (3) using both front end latching means and rear protruding port clamping as shown in FIGS. 12A–12C.

FIGS. 23A–23C illustrates a metallic cushion means for heat dissipation. FIG. 23A illustrates the construction of such cushion means. It is a side section view of a metallic cushion means 23-1 having a metallic lining 23-2 like a metallic screen on its top, and several parallel rubber strips 23-3 between the metallic lining 23-2 and the bottom panel 23-4. Between every two rubber strips 23-3 there is one air ventilation channel 23-5. FIG. 23B shows a lower case assembly installed with such cushion means. It is a top view and a side section view of lower case assembly 23-6 with metallic cushion means 23-1. FIG. 23C shows how a full size module is clamped in an external enclosure case using such cushion means. It is a side section view of upper case assembly 7-1 and lower case assembly 23-6 and a side view of module 2-1 wherein module 2-1 is clamped in between. The metallic lining 23-1 allows heat generated from module 2-1 be quickly conducted out and the air ventilation channels 23-5 between parallel rubber strips can pass hot air out to avoid heat accumulation under module 2-1. Air ventilation openings on the external enclosure case are not shown here but can be built around the case clamping zones to facilitate the internal air ventilation.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A modularized electronic system for packaging and assembling one or more electronic module assemblies comprising:

one external enclosure case having at least two case assemblies each having at least one case assembly attachment means wherein said assembly attachment means of one of said case assemblies engages and securely attaches to said assembly attachment means of another of said case assemblies in a removable manner; said external enclosure case further comprises one internal room between two of said case assemblies with one top panel, one bottom panel and at least one side panel for module mounting purpose; one of said two case assemblies comprising said top panel of the internal room is called the upper case assembly and another of said two case assemblies comprising said bottom panel of the internal room is called the lower case assembly;

at least one electronic module assembly having a module head in its front end and a substantially rectangular module body behind said module head; said module head is rigidly connected to said module body; said module head further comprises a rigid module connector installed on its bottom facing downward for transmitting digital signals and power; said lower case assembly further comprises a correspondent rigid BUS receptacle installed on said bottom panel of the internal room wherein said module connector of the module head is vertically plugged into said BUS receptacle of the lower case assembly in a removable manner whereby said module assembly is reliably mounted on said lower case assembly horizontally; the bottom of said module head on which said module connector is installed is offset from the bottom of said module body whereby said module connector can be positioned higher to make said module assembly more compact;

said module body further comprises at least one substantially flat area on each of its upper and lower ends as module clamping zones and each of said upper and lower case assemblies further comprises at least one correspondent flat area on said top panel and bottom panel of the internal room as case clamping zones wherein said module body is clamped between said case clamping zones of the upper and lower case assemblies over said module clamping zones whereby said module assembly is reliably clamped between said upper and lower case assemblies and can be easily removed or installed by hand when said upper case assembly is removed.

2. A modularized electronic system of claim 1 wherein:

said lower case assembly further comprises said side panel of the internal room behind said module body wherein the rear end of said module body engages and securely attaches to said side panel of the lower case assembly whereby said module assembly is more reliably clamped between said upper and lower case assemblies.

3. A modularized electronic system of claim 2 wherein:

said side panel of the lower case assembly further comprises a cushion means installed over the contacting part between said side panel and the rear end of said module body to enhance the module mounting and also provide shock protection to said module assembly.

4. A modularized electronic system of claim 1 wherein:
at least one of said case clamping zones of of said upper and lower case assemblies further comprises a cushion means installed over the contacting part between said case clamping zone and its correspondent module clamping zone to enhance the module clamping and also provide shock protection to said module assembly.

5. A modularized electronic system of claim 4 wherein:
said cushion means further comprises metallic material whereby heat generated from said module assembly can be conducted to said cushion means and be more effectively dissipated.

6. A modularized electronic system of claim 4 wherein:
said cushion means is an elastic device which can provide shock protection to said module assembly and also tolerate height differences of different module assemblies mounted on it.

7. A modularized electronic system of claim 1 wherein:
said module assembly further comprises a substantially rectangular protruding port on its upper end and said upper case assembly further comprises a correspondent opening on top of said upper protruding port wherein said upper protruding port extends through said top opening whereby said upper protruding port is accessible externally from the top.

8. A modularized electronic system of claim 7 wherein:
said top opening of the upper case assembly further comprises a metallic cushion means around its inner side wherein said cushion means engages and securely attaches to the surrounding part of said upper protruding port to provide electromagnetic interference and radio frequency interference protection.

9. A modularized electronic system of claim 1 wherein:
said module head further comprises a latching means and said BUS receptacle of the lower case assembly further comprises a correspondent latch receiving means wherein said latching means of the module head engages and securely latches to said latch receiving means of the BUS receptacle in a removable manner whereby the connection between said module connector of the module head and said BUS receptacle of the lower case assembly is greatly secured.

10. A modularized electronic system of claim 9 wherein:
said latching means of the module head consists of two elastic clip devices installed on its left and right hand sides; each of said elastic clip devices has a hook device installed on its lower end; said BUS receptacle of the lower case assembly further comprises two correspondent hook receiving devices on its left and right hand sides wherein said hook devices of the module head engage and securely hook to said hook receiving devices of the BUS receptacle whereby loose connection between said module connector and said BUS receptacle can be prevented.

11. A modularized electronic system of claim 1 wherein:
said module body further comprises a substantially rectangular protruding port on its rear end; said upper case assembly further comprises said side panel of the internal room for clamping the upper end of said rear protruding port and said lower case assembly further comprises said side panel of the internal room with a correspondent U-shaped side opening on its upper edge behind said rear protruding port wherein the left, right and bottom sides of said rear protruding port of the module body engages and securely attaches to the correspondent sides of said side opening of the lower case assembly in a removable manner and is clamped between said side panel of the upper case assembly and said side opening of the lower case assembly whereby said rear protruding port of the module body can be accessed externally from the rear end.

12. A modularized electronic system of claim 1 wherein:
said module clamping zone on the lower end of the module body further comprises a sticking means and said case clamping zone of the lower case assembly further comprises a correspondent sticking receiving means wherein said sticking means of the module body engages and securely sticks to said sticking receiving means of the lower case assembly in a removable manner whereby said module assembly is more reliably mounted on said lower case assembly.

13. A modularized electronic system of claim 1 wherein:
said module connector of the module head is a female connector whereby said module assembly can be more durable for module installation.

14. A modularized electronic system of claim 1 wherein:
said module body further comprises a substantially flat and straight vertical front edge between its bottom and said bottom of the module head; said BUS receptacle of the lower case assembly further comprises a correspondent flat and straight vertical edge in front of said module body wherein said vertical front edge of the module body engages and securely attaches to said vertical edge of the BUS receptacle whereby said module assembly can be more reliably mounted on said lower case assembly horizontally.

15. A modularized electronic system of claim 1 wherein:
said module body comprises at least one PCB board assembly and at least one PCB board mounting kit with substantially flat top and bottom ends for module clamping wherein said PCB board mounting kit is fastened to said PCB board assembly by at least one fastening device whereby said PCB board assembly is horizontally supported by said PCB board mounting kit and reliably clamped between said upper and lower case assemblies.

16. A modularized electronic system of claim 1 wherein:
said module assembly is a composite module which comprises at least two small module assemblies each having at least one small module attachment means wherein said small module attachment means of one of said small module assemblies engages and securely attaches to said small module attachment means of another of said small module assemblies in a removable manner whereby said composite module can be assembled or disassembled by hand and it can further allow changing of its electronic functions or mechanical features by changing its small module assemblies.

17. A modularized electronic system of claim 16 wherein:
said small module attachment means of one of said small module assemblies are two holding arms on its left and right hand sides wherein said two holding arms hold two correspondent sides of another of said small module assemblies mounted next to it whereby two said small module assemblies are reliably held together.

18. A modularized electronic system of claim 16 wherein:
said small module attachment means of one of said small module assemblies is a rigid connector for transmitting signals and power and said small module attachment means of another of said small module assemblies is a correspondent rigid receptacle wherein said connector of said small module assembly engages and securely plugs in said receptacle of another said small module assembly in a removable manner whereby two said small module assemblies are reliably connected together.

19. A modularized electronic system of claim 16 wherein:
said small module attachment means of one of said small module assemblies is a latching means and said small module attachment means of another of said small module assemblies is a latch receiving means wherein said latching means of said small module assembly engages and securely latches to said latch receiving means of another said small module assembly in a removable manner whereby two said small module assemblies are tightly latched together and can be mounted like an integral module.

20. A modularized electronic system for packaging and assembling one or more electronic module assemblies comprising:
one external enclosure case having at least two case assemblies each having at least one case assembly attachment means wherein said assembly attachment means of one of said case assemblies engages and securely attaches to said assembly attachment means of another of said case assemblies in a removable manner; said external enclosure case further comprises one internal room between two of said case assemblies with one top panel, one bottom panel and at least one side panel for module mounting purpose; one of said two case assemblies comprising said bottom panel of the internal room is called the lower case assembly;
at least one electronic module assembly having a module head in its front end and a substantially rectangular module body behind said module head; said module head is rigidly connected to said module body; said module head further comprises a rigid module connector installed on its bottom facing downward for transmitting digital signals and power; said lower case assembly further comprises a correspondent rigid BUS receptacle installed on said bottom panel of the internal room wherein said module connector of the module head is removably and vertically plugged into said BUS receptacle of the lower case assembly whereby said module assembly is reliably mounted on said lower case assembly horizontally; the bottom of said module head on which said module connector is installed is offset from the bottom of said module body whereby said module connector can be positioned higher to make said module assembly more compact;
said module body further comprises at least one flat area on its bottom with a sticking means installed and said lower case assembly further comprises a correspondent flat area on said bottom panel of the internal room with a sticking receiving means installed wherein said sticking means of the module body engages and securely sticks to said sticking receiving means of the lower case assembly whereby said module body is reliably mounted on the lower case assembly;
said module head further comprises a latching means and said BUS receptacle of the lower case assembly further comprises a correspondent latch receiving means wherein said latching means of the module head engages and securely latches to said latch receiving means of the BUS receptacle in a removable manner whereby said module assembly is reliably mounted on said lower case assembly by front end latching means and rear end sticking means.

21. A modularized electronic system of claim 20 wherein:
said lower case assembly further comprises said side panel of the internal room behind said module body wherein the rear end of said module body engages and securely attaches to said side panel of the lower case assembly whereby said module assembly is more reliably mounted on said lower case assembly.

22. A modularized electronic system of claim 21 wherein:
said side panel of the lower case assembly further comprises a cushion means installed over the contacting part between said side panel and the rear end of said module body to enhance the module mounting and also provide shock protection to said module assembly.

23. A modularized electronic system of claim 20 wherein:
said module assembly further comprises a substantially rectangular protruding port on its upper end and said upper case assembly further comprises a correspondent opening on top of said upper protruding port wherein said upper protruding port extends through said top opening whereby said upper protruding port is accessible externally from the top.

24. A modularized electronic system of claim 23 wherein:
said top opening of the upper case assembly further comprises a metallic cushion means around its inner side wherein said cushion means engages and securely attaches to the surrounding part of said upper protruding port to provide electromagnetic interference and radio frequency interference protection.

25. A modularized electronic system of claim 20 wherein:
   said latching means of the module head consists of two elastic clip devices installed on its left and right hand sides; each of said elastic clip devices has a hook device installed on its lower end; said BUS receptacle of the lower case assembly further comprises two correspondent hook receiving devices on its left and right hand sides wherein said hook devices of the module head engage and securely hook to said hook receiving devices of the BUS receptacle whereby the connection between said module connector of the module head and said BUS receptacle of the lower case assembly is greatly secured.

26. A modularized electronic system of claim 20 wherein:
   said module body further comprises a substantially rectangular protruding port on its rear end; said upper case assembly further comprises said side panel of the internal room for clamping the upper end of said rear protruding port and said lower case assembly further comprises said side panel of the internal room with a correspondent U-shaped side opening on its upper edge behind said rear protruding port wherein the left, right and bottom sides of said rear protruding port of the module body engages and securely attaches to the correspondent sides of said side opening of the lower case assembly in a removable manner and is clamped between said side panel of the upper case assembly and said side opening of the lower case assembly whereby said rear protruding port of the module body can be accessed externally from the rear end.

27. A modularized electronic system of claim 20 wherein:
   said module connector of the module head is a female connector whereby said module assembly can be more durable for module installation.

28. A modularized electronic system of claim 20 wherein:
   said module body further comprises a substantially flat and straight vertical front edge between its bottom and said bottom of the module head; said BUS receptacle of the lower case assembly further comprises a correspondent flat and straight vertical edge in front of said module body wherein said vertical front edge of the module body engages and securely attaches to said vertical edge of the BUS receptacle whereby said module assembly can be more reliably mounted on said lower case assembly horizontally.

29. A modularized electronic system of claim 20 wherein:
   said module body comprises at least one PCB board assembly and at least one PCB board mounting kit with substantially flat bottom end wherein said PCB board mounting kit is fastened to said PCB board assembly by at least one fastening device whereby said PCB board assembly is horizontally supported by said PCB board mounting kit and reliably mounted on said lower case assembly.

30. A modularized electronic system of claim 20 wherein:
   said module assembly is a composite module which comprises at least two small module assemblies each having at least one small module attachment means wherein said small module attachment means of one of said small module assemblies engages and securely attaches to said small module attachment means of another of said small module assemblies in a removable manner whereby said composite module can be assembled or disassembled by hand and it can further allow changing of its electronic functions or mechanical features by changing its small module assemblies.

31. A modularized electronic system of claim 30 wherein:
   said small module attachment means of one of said small module assemblies are two holding arms on its left and right hand sides wherein said two holding arms hold two correspondent sides of another of said small module assemblies mounted next to it whereby two said small module assemblies are reliably held together.

32. A modularized electronic system of claim 30 wherein:
   said small module attachment means of one of said small module assemblies is a rigid connector for transmitting signals and power and said small module attachment means of another of said small module assemblies is a correspondent rigid receptacle wherein said connector of said small module assembly engages and securely plugs in said receptacle of another said small module assembly in a removable manner whereby two said small module assemblies are reliably connected together.

33. A modularized electronic system of claim 30 wherein:
   said small module attachment means of one of said small module assemblies is a latching means and said small module attachment means of another of said small module assemblies is a latch receiving means wherein said latching means of said small module assembly engages and securely latches to said latch receiving means of another said small module assembly in a removable manner whereby two said small module assemblies are tightly latched together and can be mounted like an integral module.

34. A modularized electronic system for packaging and assembling one or more electronic module assemblies comprising:
   one external enclosure case having at least two case assemblies each having at least one case assembly attachment means wherein said assembly attachment means of one of said case assemblies engages and securely attaches to said assembly attachment means of another of said case assemblies in a removable manner; said external enclosure case further comprises one internal room between two of said case assemblies with one top panel, one bottom panel and at least one side panel for module mounting purpose; one of said two case assemblies comprising said top panel of the internal room is called the upper case assembly and another of said two case assemblies comprising said bottom panel of the internal room is called the lower case assembly;
   at least one electronic module assembly having a module head in its front end and a substantially rectangular module body behind said module head; said module head is rigidly connected to said module body; said module head further comprises a rigid module connector installed on its bottom facing downward for transmitting digital signals and power; said lower case assembly further comprises a correspondent rigid BUS receptacle installed on said bottom panel of the internal room wherein said module connector of the module head is vertically plugged into said BUS receptacle of the lower case assembly in a removable manner whereby said module assembly is reliably mounted on said lower case assembly horizontally; the bottom of said module head on which said module connector is installed is offset from the bottom of said module body whereby said module connector can be positioned higher to make said module assembly more compact;

said module head further comprises a latching means on its left and right hand sides and said BUS receptacle of the lower case assembly further comprises a correspondent latch receiving means on both sides wherein said latching means of the module head engages and securely latches to said latch receiving means of the BUS receptacle in a removable manner whereby the connection between said module connector of the module head and said BUS receptacle of the lower case assembly is greatly secured;

said module body further comprises at least one substantially flat area on its lower end as a module clamping zone and one substantially rectangular protruding port on its rear end; said upper case assembly further comprises said side panel of the internal room for clamping the upper end of said rear protruding port and said lower case assemblies further comprises at least one correspondent flat area on said bottom panel of the internal room as a case clamping zone and said side panel of the internal room with a correspondent U-shaped side opening on its upper edge behind said rear protruding port wherein said module clamping zone and the left, right and bottom sides of said rear protruding port of the module body engage and securely attach to said case clamping zone and the correspondent sides of said side opening of the lower case assembly in a removable manner and said rear protruding port of the module body is clamped between said side panel of the upper case assembly and said side opening of the lower case assembly whereby said module assembly is reliably clamped between said upper and lower case assemblies by front end latching means and rear protruding port clamping.

35. A modularized electronic system of claim 34 wherein:
said case clamping zone of said lower case assembly further comprises a cushion means installed over the contacting part between said case clamping zone and its correspondent module clamping zone to enhance the module clamping and also provide shock protection to said module assembly.

36. A modularized electronic system of claim 35 wherein:
said cushion means further comprises metallic material whereby heat generated from said module assembly can be conducted to said cushion means and be more effectively dissipated.

37. A modularized electronic system of claim 34 wherein:
said module assembly further comprises a substantially rectangular protruding port on its upper end and said upper case assembly further comprises a correspondent opening on top of said upper protruding port wherein said upper protruding port extends through said top opening whereby said upper protruding port is accessible externally from the top.

38. A modularized electronic system of claim 37 wherein:
said top opening of the upper case assembly further comprises a metallic cushion means around its inner side wherein said cushion means engages and securely attaches to the surrounding part of said upper protruding port to provide electromagnetic interference and radio frequency interference protection.

39. A modularized electronic system of claim 34 wherein:
said latching means installed on the left and right hand sides of the module head consists of two elastic clip devices; each of the elastic clip devices has a hook device installed on its lower end; said latch receiving means on both sides of the BUS receptacle of the lower case assembly consists of two hook receiving devices wherein said hook devices of the module head engage and securely hook to said hook receiving devices of the BUS receptacle whereby loose connection between said module connector and said BUS receptacle can be prevented.

40. A modularized electronic system of claim 34 wherein:
said module clamping zone of the module body further comprises a sticking means and said case clamping zone of the lower case assembly further comprises a correspondent sticking receiving means wherein said sticking means of the module body engages and securely sticks to said sticking receiving means of the lower case assembly in a removable manner whereby said module assembly is more reliably mounted on said lower case assembly.

41. A modularized electronic system of claim 34 wherein:
said module connector of the module head is a female connector whereby said module assembly can be more durable for module installation.

42. A modularized electronic system of claim 34 wherein:
said module body further comprises a substantially flat and straight vertical front edge between its bottom and said bottom of the module head; said BUS receptacle of the lower case assembly further comprises a correspondent flat and straight vertical edge in front of said module body wherein said vertical front edge of the module body engages and securely attaches to said vertical edge of the BUS receptacle whereby said module assembly can be more reliably mounted on said lower case assembly horizontally.

43. A modularized electronic system of claim 34 wherein:
said module body comprises at least one PCB board assembly and at least one PCB board mounting kit with substantially flat bottom end wherein said PCB board mounting kit is fastened to said PCB board assembly by at least one fastening device whereby said PCB board assembly is horizontally supported by said PCB board mounting kit and reliably clamped between said Upper and lower case assemblies.

44. A modularized electronic system of claim 34 wherein:

said module assembly is a composite module which comprises at least two small module assemblies each having at least one small module attachment means wherein said small module attachment means of one of said small module assemblies engages and securely attaches to said small module attachment means of another of said small module assemblies in a removable manner whereby said composite module can be assembled or disassembled by hand and it can further allow changing of its electronic functions or mechanical features by changing its small module assemblies.

45. A modularized electronic system of claim 44 wherein:

said small module attachment means of one of said small module assemblies are two holding arms on its left and right hand sides wherein said two holding arms hold two correspondent sides of another of said small module assemblies mounted next to it whereby two said small module assemblies are reliably held together.

46. A modularized electronic system of claim 44 wherein:

said small module attachment means of one of said small module assemblies is a rigid connector for transmitting signals and power and said small module attachment means of another of said small module assemblies is a correspondent rigid receptacle wherein said connector of said small module assembly engages and securely plugs in said receptacle of another said small module assembly in a removable manner whereby two said small module assemblies are reliably connected together.

47. A modularized electronic system of claim 44 wherein:

said small module attachment means of one of said small module assemblies is a latching means and said small module attachment means of another of said small module assemblies is a latch receiving means wherein said latching means of said small module assembly engages and securely latches to said latch receiving means of another said small module assembly in a removable manner whereby two said small module assemblies are tightly latched together and can be mounted like an integral module.

* * * * *